(12) United States Patent
Zhang et al.

(10) Patent No.: US 11,531,430 B2
(45) Date of Patent: Dec. 20, 2022

(54) FINGERPRINT DETECTION APPARATUS AND ELECTRONIC DEVICE

(71) Applicant: SHENZHEN GOODIX TECHNOLOGY CO., LTD., Shenzhen (CN)

(72) Inventors: Sichao Zhang, Shenzhen (CN); Fei Hsin Tsai, Shenzhen (CN); Yuping Liu, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/034,981

(22) Filed: Sep. 28, 2020

(65) Prior Publication Data

US 2021/0011578 A1 Jan. 14, 2021

Related U.S. Application Data

(63) Continuation of application No. PCT/CN2019/108223, filed on Sep. 26, 2019.

(30) Foreign Application Priority Data

Jul. 12, 2019 (WO) ................ PCT/CN2019/095780
Jul. 12, 2019 (WO) ................ PCT/CN2019/095880

(Continued)

(51) Int. Cl.
*G06V 40/13* (2022.01)
*G06F 3/042* (2006.01)

(52) U.S. Cl.
CPC ........ *G06F 3/0421* (2013.01); *G06V 40/1318* (2022.01)

(58) Field of Classification Search
CPC . G06F 3/0421; G06K 9/0004; G06V 40/1318
See application file for complete search history.

(56) References Cited

U.S. PATENT DOCUMENTS 10,216,975 B1 2/2019 He et al.
10,275,630 B2 4/2019 Chung et al.
(Continued)

FOREIGN PATENT DOCUMENTS

CN 104318205 A 1/2015
CN 104460115 A 3/2015
(Continued)

OTHER PUBLICATIONS

Shi, B. et al., "Identifying artificial fingerprint by using optical coherence tomography", Journal of Optoelectronics, Dec. 2013, pp. 2404-2408, vol. 24, Issue 12.
(Continued)

*Primary Examiner* — Stephen G Sherman
(74) *Attorney, Agent, or Firm* — Scully Scott Murphy & Presser

(57) ABSTRACT

A fingerprint detection apparatus and an electronic device are provided. The fingerprint detection apparatus is applied under a display screen, the fingerprint detection apparatus includes a plurality of fingerprint detecting units distributed in an array or arranged in a staggered manner, and the fingerprint detecting unit includes: a plurality of optical sensing pixels; at least one micro lens disposed above the plurality of optical sensing pixels; and at least one light shielding layer disposed between the at least one micro lens and the plurality of optical sensing pixels, each of the at least one light shielding layer being provided with an opening corresponding to the plurality of optical sensing pixels; where oblique light signals in multiple directions are respectively transmitted to the plurality of optical sensing pixels through an opening provided in the at least one light (Continued)

shielding layer after being converged by the at least one micro lens.

10 Claims, 19 Drawing Sheets

(30) Foreign Application Priority Data

Aug. 2, 2019 (WO) ................ PCT/CN2019/099135
Aug. 8, 2019 (WO) ................ PCT/CN2019/099822

(56) References Cited

U.S. PATENT DOCUMENTS

| | | | |
|---|---|---|---|
| 10,303,921 | B1 | 5/2019 | He et al. |
| 10,360,432 | B1 | 7/2019 | He et al. |
| 10,429,567 | B2 | 10/2019 | Wan et al. |
| 10,551,310 | B2 | 2/2020 | Wu et al. |
| 2008/0205711 | A1* | 8/2008 | Kishigami ........... G06K 9/0004 382/115 |
| 2014/0354597 | A1 | 12/2014 | Kitchens, II et al. |
| 2014/0354608 | A1 | 12/2014 | Kitchens, II et al. |
| 2014/0354823 | A1 | 12/2014 | Kitchens et al. |
| 2014/0354905 | A1 | 12/2014 | Kitchens et al. |
| 2014/0355846 | A1 | 12/2014 | Lee et al. |
| 2016/0227081 | A1 | 8/2016 | Chang Chien et al. |
| 2017/0124370 | A1 | 5/2017 | He et al. |
| 2017/0199610 | A1 | 7/2017 | Kitchens, II et al. |
| 2017/0220838 | A1* | 8/2017 | He ........................ G06F 3/044 |
| 2017/0270342 | A1 | 9/2017 | He et al. |
| 2017/0363794 | A1 | 12/2017 | Wan et al. |
| 2018/0239941 | A1 | 8/2018 | Mackey et al. |
| 2018/0301494 | A1 | 10/2018 | Park et al. |
| 2018/0358401 | A1 | 12/2018 | Lin et al. |
| 2019/0065717 | A1 | 2/2019 | Won et al. |
| 2019/0073508 | A1 | 3/2019 | Ling et al. |
| 2019/0095677 | A1 | 3/2019 | Chung et al. |
| 2019/0120763 | A1 | 4/2019 | Wu et al. |
| 2019/0180071 | A1 | 6/2019 | Kim |
| 2019/0266376 | A1 | 8/2019 | He et al. |
| 2019/0348457 | A1 | 11/2019 | Park et al. |
| 2019/0362120 | A1 | 11/2019 | Yeke Yazdandoost et al. |
| 2020/0035730 | A1 | 1/2020 | Tanaka |
| 2020/0074138 | A1* | 3/2020 | Sun ........................ G01L 1/14 |
| 2020/0089928 | A1 | 3/2020 | Long |
| 2020/0176499 | A1 | 6/2020 | Park et al. |
| 2020/0227459 | A1 | 7/2020 | Park et al. |
| 2020/0292741 | A1 | 9/2020 | Rhee et al. |
| 2020/0293738 | A1* | 9/2020 | Zhang ............... G02F 1/133606 |
| 2020/0327296 | A1* | 10/2020 | Wu .................... H01L 27/14678 |
| 2020/0380237 | A1* | 12/2020 | Nilsson ................ G06K 9/0004 |

FOREIGN PATENT DOCUMENTS

| | | |
|---|---|---|
| CN | 206058224 U | 3/2017 |
| CN | 107169471 A | 9/2017 |
| CN | 206470780 U | 9/2017 |
| CN | 206489579 U | 9/2017 |
| CN | 107820617 A | 3/2018 |
| CN | 107995972 A | 5/2018 |
| CN | 108241827 A | 7/2018 |
| CN | 207650835 U | 7/2018 |
| CN | 108416247 A | 8/2018 |
| CN | 108460349 A | 8/2018 |
| CN | 108537090 A | 9/2018 |
| CN | 207851850 U | 9/2018 |
| CN | 109074474 A | 12/2018 |
| CN | 109074492 A | 12/2018 |
| CN | 109154961 A | 1/2019 |
| CN | 109196524 A | 1/2019 |
| CN | 109313704 A | 2/2019 |
| CN | 109426305 A | 3/2019 |
| CN | 109508577 A | 3/2019 |
| CN | 109545813 A | 3/2019 |
| CN | 109716350 A | 5/2019 |
| CN | 109791609 A | 5/2019 |
| CN | 109791613 A | 5/2019 |
| CN | 208848221 U | 5/2019 |
| CN | 109844766 A | 6/2019 |
| CN | 109863506 A | 6/2019 |
| CN | 109983471 A | 7/2019 |
| CN | 109983472 A | 7/2019 |
| CN | 110062931 A | 7/2019 |
| CN | 209168144 U | 7/2019 |
| CN | 210052176 U | 2/2020 |
| CN | 210864747 U | 6/2020 |
| EP | 3447685 A1 | 2/2019 |
| JP | 2010020237 A | 1/2010 |
| KR | 101948870 B1 | 2/2019 |
| KR | 20190023937 A | 3/2019 |
| WO | 2018180569 A1 | 10/2018 |
| WO | 2019066414 A1 | 4/2019 |

OTHER PUBLICATIONS

Lee, Y. et al., "Metamaterials and Metasurfaces for Sensor Applications", Sensors, 2017, pp. 1-28.

Tan, J., "Peptide fingerprint detection and latent fingerprint visualization using porous silicon", Doctoral dissertation, Zhejiang University, Aug. 15, 2016, pp. 1-152.

Feng, G., "The research of fingerprint recognition arithmetic and hardware realization", Doctoral dissertation, PLA University of Information Engineering, Jun. 15, 2013, pp. 1-67.

Prabhakar, S. et al., "Biometric recognition: Sensor characteristics and image quality", Instrumentation & Measurement Magazine, Jun. 30, 2011, pp. 10-16, vol. 14, No. 3.

Cho, A. et al., "Nano-Si Optical Pixel-Sensor Array using TFT Technology as Image-Scan/Fingerprint Panel", SID Symposium Digest of Technical Papers, Jul. 1, 2013, pp. 1066-1069, vol. 44, No. 1.

* cited by examiner

21

21

| 2 | 1 | 2 | 1 | 2 | 1 | 2 | 1 |
|---|---|---|---|---|---|---|---|
| 3 | 4 | 3 | 4 | 3 | 4 | 3 | 4 |
| 2 | 1 | 2 | 1 | 2 | 1 | 2 | 1 |
| 3 | 4 | 3 | 4 | 3 | 4 | 3 | 4 |
| 2 | 1 | 2 | 1 | 2 | 1 | 2 | 1 |
| 3 | 4 | 3 | 4 | 3 | 4 | 3 | 4 |
| 2 | 1 | 2 | 1 | 2 | 1 | 2 | 1 |
| 3 | 4 | 3 | 4 | 3 | 4 | 3 | 4 |

| 1 | 1 | 2 | 2 |
|---|---|---|---|
| 1 | 1 | 2 | 2 |
| 1 | 1 | 2 | 2 |
| 1 | 1 | 2 | 2 |
| 1 | 1 | 2 | 2 |

FIG. 15

| | 2 | | 1 | | |
|---|---|---|---|---|---|
| | | | | 2 | 1 |
| | 3 | 2 | 4 | 1 | 0 |
| 2 | | 1 | 0 | 3 | 4 |
| | 0 | 3 | 2 | 4 | 1 |
| 3 | | 4 | | 0 | |
| | | | 3 | | 3 |

| 2 | 2 | 1 | 1 | 2 | 2 | 1 | 1 |
|---|---|---|---|---|---|---|---|
| 2 | 2 | 1 | 1 | 2 | 2 | 1 | 1 |
| 3 | 3 | 4 | 4 | 3 | 3 | 4 | 4 |
| 3 | 3 | 4 | 4 | 3 | 3 | 4 | 4 |
| 2 | 2 | 1 | 1 | 2 | 2 | 1 | 1 |
| 2 | 2 | 1 | 1 | 2 | 2 | 1 | 1 |
| 3 | 3 | 4 | 4 | 3 | 3 | 4 | 4 |
| 3 | 3 | 4 | 4 | 3 | 3 | 4 | 4 |

FINGERPRINT DETECTION APPARATUS AND ELECTRONIC DEVICE

CROSS-REFERENCE TO RELATED APPLICATIONS

This application is a continuation of International Application No. PCT/CN2019/108223, filed on Sep. 26, 2019, which claims priority to International Application No. PCT/CN2019/095780, filed on Jul. 12, 2019, PCT Application No. PCT/CN2019/095880, filed on Jul. 12, 2019, PCT Application No. PCT/CN2019/099135, filed on Aug. 2, 2019, and PCT Application No. PCT/CN2019/099822 filed on Aug. 8, 2019. All of the aforementioned patent applications are hereby incorporated by reference in their entireties.

TECHNICAL FIELD

Embodiments of the present application relate to the field of fingerprint detection, and more particularly, to a fingerprint detection apparatus and an electronic device.

BACKGROUND

With rapid development of a terminal industry, biometric identification technology has received more and more attention from people, and practical usage of more convenient under-screen biometric identification technology, such as under-screen optical fingerprint identification technology, has become a popular requirement. The under-screen optical fingerprint identification technology is to dispose an optical fingerprint module under a display screen to achieve fingerprint identification by capturing an optical fingerprint image. The principle of an under-screen fingerprint optical system is to illuminate a fingerprint with light emitted from a screen itself, and to capture and identify a light signal reflected via a finger above the screen by an optical fingerprint module under the screen after the light signal passes through the screen. For example, the optical fingerprint module may converge received light signals to an optical sensing pixel array through a micro lens array, and the optical sensing pixel array generates a fingerprint image based on the received light signals for fingerprint identification.

However, since a micro lens array in the related art is located right above or obliquely above an optical sensing pixel array, and one micro lens corresponds to one optical sensing pixel, that is, each micro lens in the micro lens array focuses received light on an optical sensing pixel corresponding to a same micro lens, Therefore, a fingerprint identification region of the optical fingerprint module is affected by a size of the micro lens array.

Therefore, how to improve a region for fingerprint identification has become an urgent technical problem to be solved.

SUMMARY

A fingerprint detection apparatus and an electronic device are provided, and a fingerprint identification region of the fingerprint detection apparatus could be effectively increased without the increase of a size of a micro lens array.

In a first aspect, a fingerprint detection apparatus is provided, where the fingerprint detection apparatus is applied under a display screen to achieve under-screen optical fingerprint detection, the fingerprint detection apparatus includes a plurality of fingerprint detecting units distributed in an array or arranged in a staggered manner, and each of the plurality of fingerprint detecting units includes:

a plurality of optical sensing pixels;

at least one micro lens disposed above the plurality of optical sensing pixels; and at least one light shielding layer disposed between the at least one micro lens and the plurality of optical sensing pixels, each of the at least one light shielding layer being provided with an opening corresponding to the plurality of optical sensing pixels;

where oblique light signals in multiple directions reflected from a finger above the display screen are respectively transmitted to the plurality of optical sensing pixels through an opening provided in the at least one light shielding layer after being converged by the at least one micro lens, and the oblique light signals are used to detect fingerprint information of the finger.

Oblique light signals in multiple directions reflected from a finger above the display screen are respectively transmitted to the plurality of optical sensing pixels through an opening provided in the at least one light shielding layer after being converged by the at least one micro lens, which can not only reduce an exposure duration of time of the plurality of optical sensing pixels and a thickness and cost of a fingerprint detection apparatus, but also improve robustness, tolerance, an angle of the field of view and the field of view of the fingerprint detection apparatus, and further improve a fingerprint identification effect, especially a fingerprint identification effect of a dry finger.

A number of the at least one micro lens is equal to a number of the plurality of optical sensing pixels, where one micro lens is disposed above each of the plurality of optical sensing pixels.

In some possible implementation manners, the at least one micro lens is a rectangular array of 2×2 micro lenses, the plurality of optical sensing pixels are a rectangular array of 2×2 optical sensing pixels, and one micro lens is disposed right above each optical sensing pixel in the rectangular array of 2×2 optical sensing pixels.

In some possible implementation manners, the rectangular array of 2×2 micro lenses receive the oblique light signals in the multiple directions in a clockwise direction, and each micro lens in the rectangular array of 2×2 micro lenses converges received oblique light signals to an optical sensing pixel below an adjacent micro lens in the clockwise direction; or the rectangular array of 2×2 micro lenses receive the oblique light signals in the multiple directions in a counterclockwise direction, and each micro lens in the rectangular array of 2×2 micro lenses converges received oblique light signals to an optical sensing pixel below an adjacent micro lens in the counterclockwise direction.

In some possible implementation manners, the rectangular array of 2×2 micro lenses receive the oblique light signals in the multiple directions in a diagonal direction of the rectangular array of 2×2 micro lenses, and each micro lens in the rectangular array of 2×2 micro lenses converges received oblique light signals to an optical sensing pixel below an adjacent micro lens in the diagonal direction.

In some possible implementation manners, the at least one micro lens is multiple rows of micro lenses, and the plurality of optical sensing pixels are multiple rows of optical sensing pixels corresponding to the multiple rows of micro lenses, where each row of optical sensing pixels in the multiple rows of optical sensing pixels is disposed below a corresponding row of micro lenses in a dislocated manner.

In some possible implementation manners, the multiple rows of micro lenses receive the oblique light signals in the multiple directions in a dislocation direction of the multiple rows of optical sensing pixels, and each row of micro lenses in the multiple rows of micro lenses converges received oblique light signals to optical sensing pixels below a same row of micro lenses.

In some possible implementation manners, a projection of each micro lens in each row of micro lenses in the multiple rows of micro lenses on a plane where the display screen is located is a circle, a projection of each optical sensing pixel in each row of optical sensing pixels in the multiple rows of optical sensing pixels on the plane where the display screen is located is a rectangle, a projection of a center of each optical sensing pixel in each row of optical sensing pixels in the multiple rows of optical sensing pixels on the plane where the display screen is located, relative to a projection of a center of a corresponding micro lens on the plane where the display screen is located, is offset by a preset distance in a dislocation direction of the multiple rows of optical sensing pixels, and the preset distance is less than or equal to a side length of the rectangle or a diameter of the circle.

In some possible implementation manners, a number of the at least one micro lens is less than a number of the plurality of optical sensing pixels.

In some possible implementation manners, the at least one micro lens is one micro lens, and the plurality of optical sensing pixels are a rectangular array of 2×2 optical sensing pixels, where the one micro lens is disposed right above the rectangular array of 2×2 optical sensing pixels.

In some possible implementation manners, the one micro lens receives the oblique light signals in the multiple directions in a diagonal direction of the rectangular array of 2×2 optical sensing pixels, and the one micro lens converges the oblique light signals in the multiple directions respectively to optical sensing pixels in the rectangular array of 2×2 optical sensing pixels in the diagonal direction.

In some possible implementation manners, the one micro lens is a rectangular array of 2×2 micro lenses, the plurality of optical sensing pixels are a rectangular array of 3×3 optical sensing pixels, and one micro lens is disposed right above every four adjacent optical sensing pixels in the rectangular array of 3×3 optical sensing pixels.

In some possible implementation manners, each micro lens in the rectangular array of 2×2 micro lenses converges received oblique light signals to an optical sensing pixel in optical sensing pixels at four corners of the rectangular array of 3×3 optical sensing pixels that is closest to a same micro lens.

In some possible implementation manners, the at least one micro lens is a rectangular array of 3×3 micro lenses, the plurality of optical sensing pixels are a rectangular array of 4×4 optical sensing pixels, and one micro lens is disposed right above every four adjacent optical sensing pixels in the rectangular array of 4×4 optical sensing pixels.

In some possible implementation manners, a central micro lens in the rectangular array of 3×3 micro lenses converges received oblique light signals respectively to four optical sensing pixels below the central micro lens, each of micro lenses at four corners in the rectangular array of 3×3 micro lenses converges received oblique light signals to an optical sensing pixel located at a corner of the rectangular array of 4×4 optical sensing pixels below a same micro lens, and each of the other micro lenses in the rectangular array of 3×3 micro lenses converges received oblique light signals to two optical sensing pixels on an outer side below a same micro lens.

In some possible implementation manners, the at least one light shielding layer is a plurality of light shielding layers, a bottom light shielding layer of the plurality of light shielding layers is provided with a plurality of openings respectively corresponding to the plurality of optical sensing pixels so that the at least one micro lens converges the oblique light signals in the multiple directions respectively to the plurality of optical sensing pixels through the plurality of openings.

In some possible implementation manners, apertures of openings in the plurality of light shielding layers corresponding to a same optical sensing pixel decrease in order from top to bottom.

In some possible implementation manners, a top light shielding layer of the plurality of light shielding layers is provided with at least one opening corresponding to the plurality of optical sensing pixels.

In some possible implementation manners, the at least one light shielding layer is one light shielding layer, and the one light shielding layer is provided with a plurality of oblique holes respectively corresponding to the plurality of optical sensing pixels so that the at least one micro lens converges the oblique light signals in the multiple directions respectively to the plurality of optical sensing pixels through the plurality of oblique holes.

In some possible implementation manners, a thickness of the one light shielding layer is greater than or equal to a preset thickness so that the plurality of oblique holes are respectively used to transmit the oblique light signals in the multiple directions.

In some possible implementation manners, the fingerprint detection apparatus further includes:

a transparent medium layer;

where the transparent medium layer is used to connect the at least one micro lens, the at least one light shielding layer and the plurality of optical sensing pixels.

In some possible implementation manners, the fingerprint detection apparatus further includes:

a filter layer;

where the filter layer is disposed in a light path between the at least one micro lens and the plurality of optical sensing pixels or disposed above the at least one micro lens, and used to filter out a light signal in a non-target wave band to transmit a light signal in a target wave band.

In a second aspect, an electronic device is provided, including:

a display screen; and the fingerprint detection apparatus in the first aspect or in any possible implementation manner in the first aspect, where the apparatus is disposed under the display screen to achieve under-screen optical fingerprint detection.

BRIEF DESCRIPTION OF DRAWINGS

FIG. 5 to FIG. 29 are schematic structural diagrams of a fingerprint detection apparatus according to an embodiment of the present application.

DESCRIPTION OF EMBODIMENTS

Technical solutions in the present application will be described hereinafter with reference to accompanying drawings.

The technical solutions of embodiments of the present application may be applied to various electronic devices. For example, portable or mobile computing devices such as smartphones, laptops, tablets and gaming devices, and other electronic devices such as electronic databases, automobiles and bank automated teller machines (ATM), which are not limited in the embodiments of the present application.

The technical solutions of the embodiments of the present application may be applied to biometric identification technology. The biometric identification technology includes, but is not limited to, identification technologies, such as fingerprint identification, palm print identification, iris identification, human face identification and living body identification. For convenience of illustration, fingerprint identification technology will be described below as an example.

The technical solutions of the embodiments of the present application may be used for under-screen fingerprint identification technology and in-screen fingerprint identification technology.

The under-screen fingerprint identification technology refers to mounting a fingerprint identification module under a display screen, so as to achieve a fingerprint identification operation in a display region of the display screen without setting a fingerprint capturing region in a region other than the display region on a front face of an electronic device. Specifically, the fingerprint identification module uses light returned from a top surface of a display component of the electronic device for fingerprint sensing and other sensing operations. This returned light carries information about an object (for example, a finger) that is in contact with or near the top surface of the display component, and the fingerprint identification module located under the display component achieves under-screen fingerprint identification by capturing and detecting this returned light. The fingerprint identification module may be designed to achieve desired optical imaging by properly configuring an optical element for capturing and detecting returned light so that fingerprint information of the finger is detected.

Correspondingly, the in-screen (In-display) fingerprint identification technology refers to mounting a fingerprint identification module or a part of a fingerprint identification module inside a display screen, so as to achieve a fingerprint identification operation in a display region of the display screen without setting a fingerprint capturing region in a region other than the display region on a front face of an electronic device.

Figure 1:
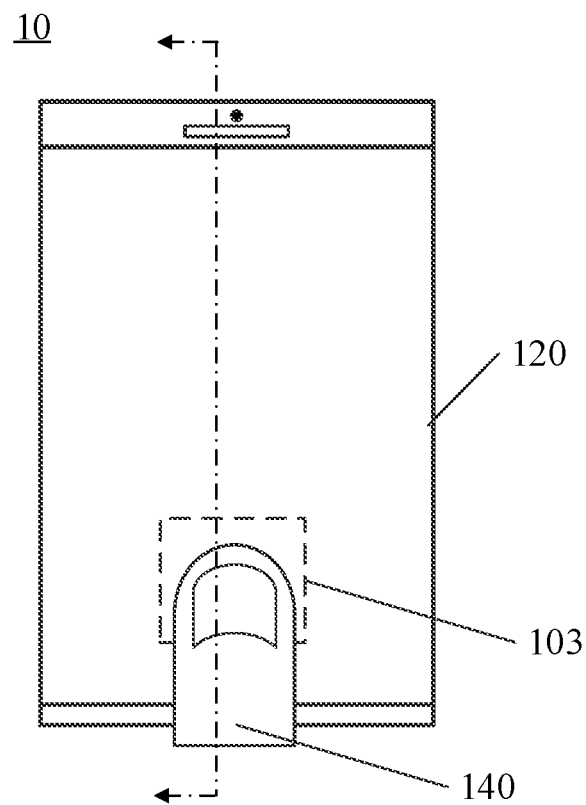
FIG. 1 is a schematic structural diagram of an electronic device to which the present application is applicable.
Figure 2:
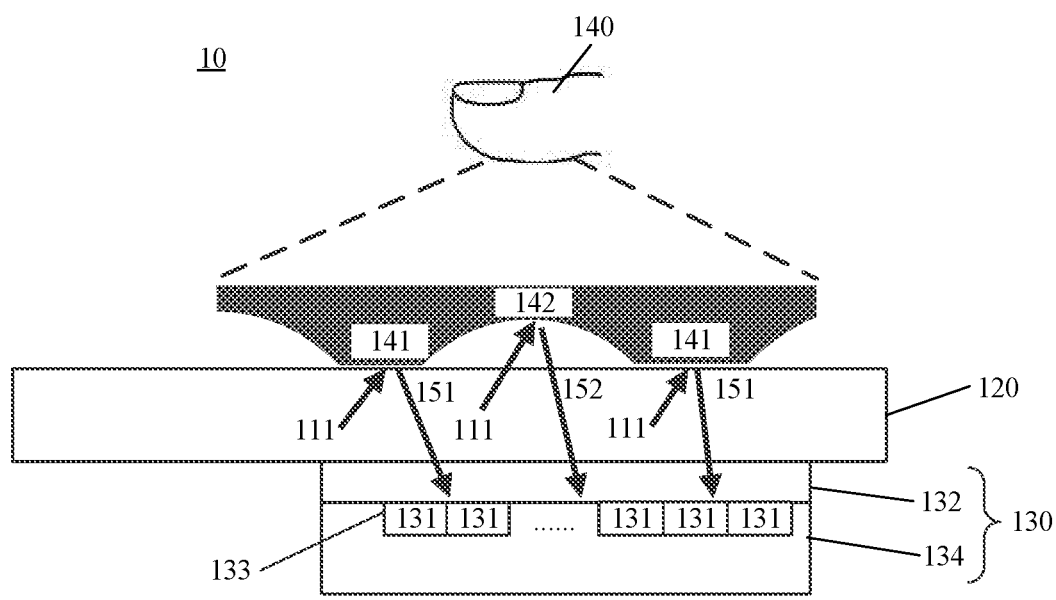
FIG. 2 is a schematic cross-sectional view of the electronic device shown in FIG. 1.
Figure 3:
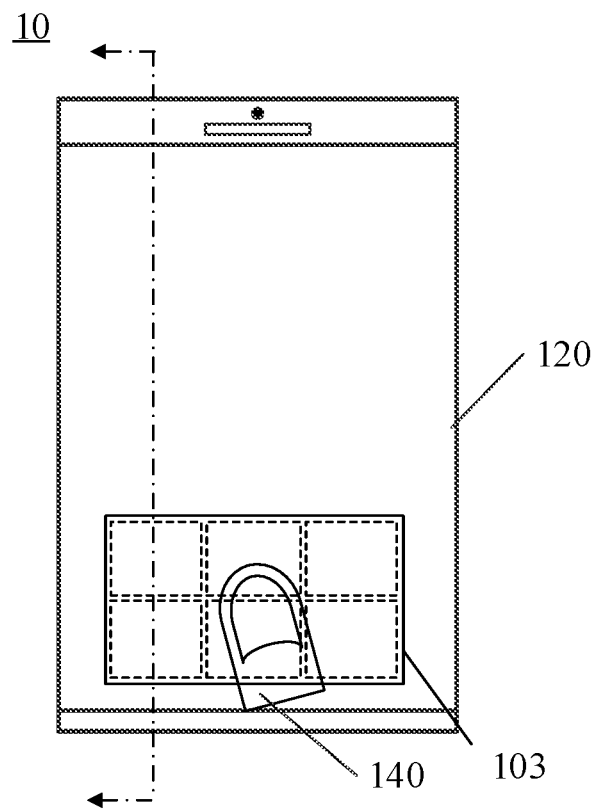
FIG. 3 is another schematic structural diagram of an electronic device to which the present application is applicable.
Figure 4:
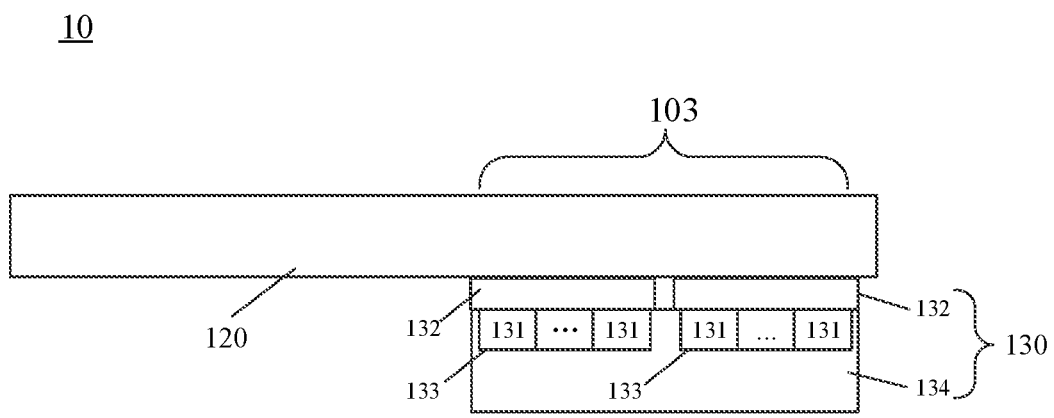
FIG. 4 is a schematic cross-sectional view of the electronic device shown in FIG. 3.

FIG. 1 to FIG. 4 illustrate schematic diagrams of an electronic device to which the embodiments of the present application are applicable. FIG. 1 and FIG. 3 are schematic oriented diagrams of an electronic device 10; and FIG. 2 and FIG. 4 are schematic cross-sectional views of the electronic device 10 shown in FIG. 1 and FIG. 3, respectively.

With reference to FIG. 1 to FIG. 4, the electronic device 10 may include a display screen 120 and an optical fingerprint module 130.

The display screen 120 may be a self-light-emitting display screen that adopts a self-light-emitting display unit as a display pixel. For example, the display screen 120 may be an organic light-emitting diode (OLED) display screen or a micro light-emitting diode (Micro-LED) display screen. In other alternative embodiments, the display screen 120 may also be a liquid crystal display (LCD) screen or other passive light-emitting display screens, which is not limited in the embodiments of the present application. Further, the display screen 120 may specifically be a touch display screen, which may not only display an image, but also detect a touch or press operation of a user, thereby providing the user with a human-machine interaction interface. For example, in an embodiment, the electronic device 10 may include a touch sensor, and the touch sensor may specifically be a touch panel (TP), which may be disposed on a surface of the display screen 120, or may be partially integrated or entirely integrated into an interior of the display screen 120 to form the touch display screen.

The optical fingerprint module 130 includes an optical fingerprint sensor that includes a sensing array 133 having a plurality of optical sensing units 131 (which may also be referred to as optical sensing pixels, photosensitive pixels, pixel units, or the like). A region where the sensing array 133 is located or a sensing region of the sensing array 133 is a fingerprint detecting region 103 (which is also referred to as a fingerprint capturing region, a fingerprint identification region, or the like) of the optical fingerprint module 130. For example, the optical sensing units 131 may be photo detectors, that is, the sensing array 133 may specifically be a photo detector array including a plurality of photo detectors distributed in an array.

The optical fingerprint module 130 is disposed in a partial region under the display screen 120.

With continuing reference to FIG. 1, the fingerprint detecting region 103 may be located in a display region of the display screen 120. In an alternative embodiment, the optical fingerprint module 130 may also be disposed at another position, such as a side of the display screen 120 or an non-light-transmitting region of an edge of the electronic device 10, and a light signal from at least part of the display region of the display screen 120 is directed to the optical fingerprint module 130 through a light path design, so that the fingerprint detecting region 103 is actually located in the display region of the display screen 120.

For the electronic device 10, when a user needs to unlock the electronic device 10 or perform other fingerprint verification, a fingerprint input can be achieved merely by pressing a finger against the fingerprint detecting region 103 in the display screen 120. Since fingerprint detection can be achieved in the screen, there is no need to reserve space for a front face of the electronic device 10 in the foregoing structure to set a fingerprint button (such as a Home button), so that a full screen scheme can be adopted; that is, the display region of the display screen 120 can be substantially extended to the entire front face of the electronic device 10.

With continuing reference to FIG. 2, the optical fingerprint module 130 may include a light detecting portion 134 and an optical component 132. The light detecting portion 134 includes the sensing array 133 (which may also be referred to as an optical fingerprint sensor), a readout circuit and other auxiliary circuits electrically connected to the sensing array 133, and may be fabricated on a die by a semiconductor process, such as an optical imaging chip or an optical fingerprint sensor. The optical component 132 may be disposed above the sensing array 133 of the light detecting portion 134, and may specifically include a filter layer, a light directing layer or a light path directing structure, and other optical elements. The filter layer may be used to filter out ambient light penetrating a finger, and the light directing layer or light path directing structure is mainly used to direct reflected light reflected from a finger surface to the sensing array 133 for optical detection.

In some embodiments of the present application, the optical component 132 and the light detecting portion 134 may be encapsulated in a same optical fingerprint member. For example, the optical component 132 and the optical detecting portion 134 may be encapsulated in a same optical fingerprint chip, or the optical component 132 may be disposed outside a chip where the optical detecting portion 134 is located, for example, the optical component 132 is attached above the chip, or some elements of the optical component 132 are integrated into the foregoing chip.

In some embodiments of the present application, a region where the sensing array 133 of the optical fingerprint module 130 is located or an optical sensing range of the sensing array 133 of the optical fingerprint module 130 corresponds to the fingerprint detecting region 103 of the optical fingerprint module 130. An area of the fingerprint capturing region 103 of the optical fingerprint module 130 may be equal to or not equal to an area of the region where the sensing array 133 of the optical fingerprint module 130 is located or the optical sensing range of the sensing array 133 of the optical fingerprint module 130, which is not specifically limited in the embodiment of the present application.

For example, a light path is directed by means of light collimation, and the area of the fingerprint detecting region 103 of the optical fingerprint module 130 may be designed to be substantially identical with the area of the sensing array of the optical fingerprint module 130.

For another example, the area of the fingerprint detecting region 103 of the optical fingerprint module 130 may be larger than the area of the sensing array 133 of the optical fingerprint module 130 through for example, a lens imaging light path design, a reflective folding light path design or other light path designs such as light convergence or reflection.

A light path directing structure that the optical component 132 may include will be exemplarily described below.

In an example that the light path directing structure adopts an optical collimator having an array of through holes with a high aspect ratio, the optical collimator may specifically be a collimator layer fabricated on a semiconductor silicon wafer, which has a plurality of collimating units or micro holes, and the collimating units may specifically be small holes. Among reflected light reflected back from a finger, light that is vertically incident to the collimating unit may pass through the collimating unit and be received by a sensor chip below the collimating unit, and light with an overlarge incident angle is attenuated through multiple reflections inside the collimating unit. Therefore, each sensor chip may basically only receive reflected light reflected back from a fingerprint pattern right above the sensor chip, which could effectively improve image resolution and then improve a fingerprint identification effect.

In an example that the light path directing structure adopts a light path design of an optical lens, the light path directing structure may be an optical lens layer having one or more lens units, for example, a lens group composed of one or more aspheric lenses, for converging reflected light reflected back from a finger to the sensing array 133 of the light detecting portion 134 below the optical lens layer, so that the sensing array 133 may perform imaging based on the reflected light so as to obtain a fingerprint image of the finger. Further, the optical lens layer may further be provided with a pinhole or a micro hole diaphragm formed in a light path of the lens unit. For example, one or more light blocking sheets may be provided in the light path of the lens unit, where at least one light blocking sheet may be provided with a light-transmitting micro hole formed in an optical axis or an optical center area of the lens unit, and the light-transmitting micro hole may serve as the foregoing pinhole or micro hole diaphragm. The pinhole or micro hole diaphragm may cooperate with the optical lens layer and/or another optical film layer above the optical lens layer and expand the field of view of the optical fingerprint module 130 to improve a fingerprint imaging effect of the optical fingerprint module 130.

In an example that the light path directing structure adopts a light path design of a micro lens layer, the light path directing structure may be a micro lens array formed by a plurality of micro lenses, which may be provided above the sensing array 133 of the light detecting portion 134 by a semiconductor growth process or other processes, and each micro lens may correspond to one of the sensing units in the sensing array 133. Moreover, another optical film layer such as a medium layer or a passivation layer may be provided between the micro lens layer and the sensing units. More specifically, a light shielding layer (or referred to as a light blocking layer, a light resisting layer, or the like) having micro holes (or referred to as openings) may further be provided between the micro lens layer and the sensing units, where a micro hole is provided between a corresponding micro lens and a corresponding sensing unit, and the light shielding layer may shield optical interference between adjacent micro lenses and sensing units so that light corresponding to the sensing unit is converged to an interior of the micro hole through the micro lens and transmitted to the sensing unit via the micro hole for optical fingerprint imaging.

It should be understood that the forgoing several implementations for a light path directing structure may be used alone or in combination.

For example, a micro lens layer may be further disposed above or below the collimator layer or the optical lens layer. Certainly, when the collimator layer or the optical lens layer is used in combination with the micro lens layer, the specific laminated structure or light path may require to be adjusted according to actual needs.

On the other hand, the optical component 132 may further include other optical elements, for example, a filter layer or other optical films, which may be disposed between the light path directing structure and the optical fingerprint sensor or between the display screen 120 and the light path directing structure, and are mainly used to isolate the impact of external interference light on optical fingerprint detection. The filter layer may be used to filter out ambient light that penetrates a finger and enters into the optical fingerprint sensor via the display screen 120. Similar to the light path directing structure, the filter layer may be respectively configured for each optical fingerprint sensor to filter out interference light, or a filter layer with a large area may be adopted to cover a plurality of optical fingerprint sensors simultaneously.

The optical fingerprint module 130 may be used for capturing fingerprint information (such as fingerprint image information) of a user.

The following is described by an example that the display screen 120 adopts a display screen with a self-light-emitting display unit, for example, an organic light-emitting diode (OLED) display screen or a micro light-emitting diode (Micro-LED) display screen. The optical fingerprint module 130 may use a display unit (that is, an OLED light source) of the OLED display screen 120 located in the fingerprint detecting region 103 as an excitation light source for optical fingerprint detection. When a finger 140 is pressed against the fingerprint detecting region 103, the display screen 120 emits a beam of light 111 to the target finger 140 above the fingerprint detecting region 103, and the light 111 is reflected by a surface of the finger 140 to form reflected light or scattered inside the finger 140 to form scattered light (transmissive light). In related patent applications, the foregoing reflected light and scattered light are collectively referred to as reflected light for convenience of description. Since a ridge 141 and a valley 142 of a fingerprint have different light reflecting capabilities, reflected light 151 from the ridge of the fingerprint and reflected light 152 from the valley of the fingerprint have different light intensities. After passing through the optical component 132, the reflected light is received by the sensing array 133 in the optical fingerprint module 130 and converted into a corresponding electrical signal, that is, a fingerprint detecting signal; and fingerprint image data may be obtained based on the fingerprint detecting signal, and fingerprint matching verification may be further performed, thereby achieving an optical fingerprint identification function in the electronic device 10.

In other alternative solutions, the optical fingerprint module 130 may also use an internal light source or an external light source to provide a light signal for fingerprint detection and identification. In this case, the optical fingerprint module 130 can not only apply to a self-light-emitting display screen such as an OLED display screen, but also apply to a non-self-light-emitting display screen such as a liquid crystal display screen or another passive light-emitting display screen.

In an example of a liquid crystal display screen having a backlight module and a liquid crystal panel, in order to support under-screen fingerprint detection of the liquid crystal display screen, an optical fingerprint system of the electronic device 10 may further include an excitation light source for optical fingerprint detection. The excitation light source may specifically be an infrared light source or a light source of non-visible light at a specific wavelength, which may be disposed below the backlight module of the liquid crystal display screen or disposed in an edge area below a protective cover of the electronic device 10. The optical fingerprint module 130 may be disposed below the liquid crystal panel or an edge area of the protective cover, and by being directed over a light path, light for fingerprint detection may reach the optical fingerprint module 130. Alternatively, the optical fingerprint module 130 may also be disposed below the backlight module, and the backlight module allows the light for fingerprint detection to pass through the liquid crystal panel and the backlight module and reach the optical fingerprint module 130 by providing an opening on film layers such as a diffusion sheet, a brightening sheet, a reflection sheet or the like, or by performing other optical designs. When the optical fingerprint module 130 provides a light signal for fingerprint detection by adopting an internal light source or an external light source, a detection principle is consistent with the foregoing description.

In a specific implementation, the electronic device 10 may further include a transparent protective cover; and the cover may be a glass cover or a sapphire cover which is located above the display screen 120 and covers a front face of the electronic device 10. Therefore, in an embodiment of the present application, the so-called finger being pressed against the display screen 120 actually refers to the finger being pressed against the cover above the display screen 120 or a surface of a protective layer covering the cover.

On the other hand, the optical fingerprint module 130 may only include one optical fingerprint sensor, and in this case, the fingerprint detecting region 103 of the optical fingerprint module 130 has a smaller area and a fixed position, and therefore, when an fingerprint input is performed, the user needs to press the finger at a specific position of the fingerprint detecting region 103, otherwise the optical fingerprint module 130 may not be able to capture a fingerprint image, thereby resulting in poor user experience. In other alternative embodiments, the optical fingerprint module 130 may specifically include a plurality of optical fingerprint sensors. The plurality of optical fingerprint sensors may be disposed under the display screen 120 side by side in a splicing manner, and sensing regions of the plurality of optical fingerprint sensors collectively constitute the fingerprint detecting region 103 of the optical fingerprint module 130. Thus the fingerprint detecting region 103 of the optical fingerprint module 130 may extend to a main region of a lower half part of the display screen, that is, to a region generally pressed against by the finger, thereby achieving a blind pressing type of fingerprint input operation. Further, when the number of the optical fingerprint sensors is sufficient, the fingerprint detecting region 103 may also extend to a half of the display region or even the entire display region, thereby achieving half-screen or full-screen fingerprint detection.

With reference to FIG. 3 and FIG. 4, an optical fingerprint module 130 in the electronic device 10 may include a plurality of optical fingerprint sensors, the plurality of optical fingerprint sensors may be disposed under a display screen 120 side by side in a splicing manner or the like for example, and sensing regions of the plurality of optical fingerprint sensors collectively constitute a fingerprint detecting region 103 of the optical fingerprint module 130.

Further, the optical component 132 may include a plurality of light path directing structures, and each light path directing structure respectively corresponds to one optical fingerprint sensor (that is, a sensing array 133) and is respectively attached above a corresponding optical fingerprint sensor. Alternatively, the plurality of optical fingerprint sensors may also share an entire light path directing structure, that is, the light path directing structure has an area large enough to cover sensing arrays of the plurality of optical fingerprint sensors.

In an example that the optical component 132 adopts an optical collimator having an array of through holes with a high aspect ratio, when the optical fingerprint module 130 includes a plurality of optical fingerprint sensors, one or more collimating units may be configured for one optical sensing unit in an optical sensing array of each optical fingerprint sensor, and attached above a corresponding optical sensing unit. Certainly, a plurality of optical sensing units may also share one collimating unit, that is, the one collimating unit has a sufficiently large aperture to cover the plurality of optical sensing units. Since one collimating unit may correspond to a plurality of optical sensing units or one optical sensing unit corresponds to a plurality of collimating units, and a correspondence between a spatial period of the display screen 120 and a spatial period of the optical fingerprint sensors is broken, even if a spatial structure of a light-emitting display array of the display screen 120 and a spatial structure of the optical sensing array of the optical fingerprint sensor are similar, it could be effectively avoided that the optical fingerprint module 130 uses a light signal passing through the display screen 120 to perform fingerprint imaging to generate Moire fringes, and the fingerprint identification effect of the optical fingerprint module 130 is effectively improved.

In an example that the optical component 132 adopts an optical lens, when the optical fingerprint module 130 includes a plurality of sensor chips, one optical lens may be configured for each of the sensor chips for fingerprint imaging, or one optical lens may be configured for the plurality of sensor chips to achieve light convergence and fingerprint imaging. Even when one sensor chip has dual sensing arrays (Dual-Array) or multiple sensing arrays (Multi-Array), two or more optical lenses may be configured for this sensor chip to cooperate with the dual sensing arrays or the multiple sensing arrays for optical imaging, so as to reduce an imaging distance and enhance the imaging effect.

It should be understood that FIGS. 1 to 4 are only examples of the present application and should not be understood as limitation to the present application.

For example, the present application does not specifically limit the number, size, and arrangement of the fingerprint sensors, which can be adjusted according to actual needs. For example, the optical fingerprint module 130 may include a plurality of fingerprint sensors distributed in a square or a circle.

It should be noted that, assuming that an optical directing structure that the optical component 132 includes is an optical collimator or a micro lens array, the effective field of view of the sensing array 133 of the optical fingerprint module 130 is limited by an area of the optical component. In an example of a micro lens array, in a general design, the micro lens array is located right above or obliquely above the sensing array 133, and one micro lens corresponds to one optical sensing unit, that is, each micro lens in the micro lens array focuses received light on an optical sensing unit corresponding to a same micro lens. Therefore, the fingerprint identification region of the sensing array 133 is affected by a size of the micro lens array.

Therefore, how to improve a region for fingerprint identification has become an urgent technical problem to be solved.

Figure 5:
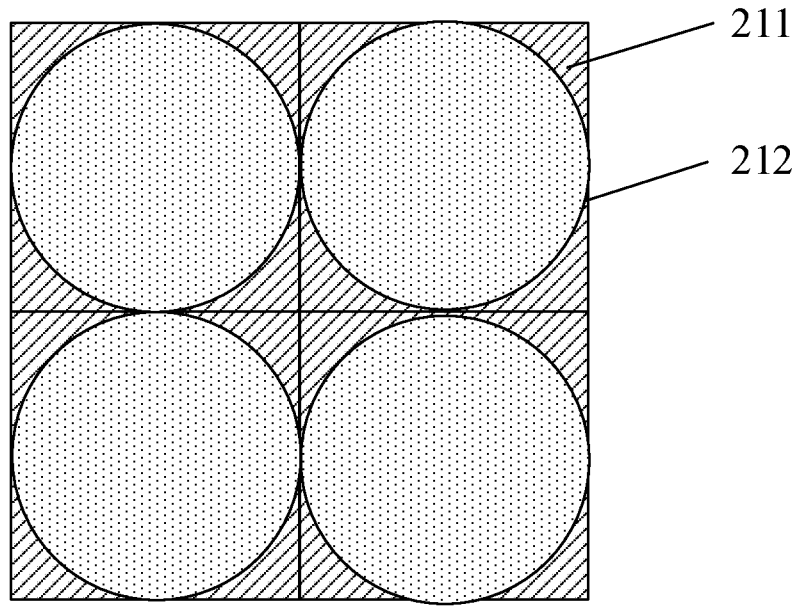

A fingerprint detection apparatus according to the embodiments of the present application is applied under a display screen to achieve under-screen optical fingerprint detection. The fingerprint detection apparatus may be applicable to the electronic device 10 shown in FIG. 1 to FIG. 4, or the apparatus may be the optical fingerprint module 130 shown in FIG. 1 to FIG. 4. As shown in FIG. 5, the fingerprint detection apparatus includes a plurality of fingerprint detecting units 21.

It should be understood that the fingerprint detection apparatus may include a plurality of fingerprint detecting units distributed in an array or arranged in a staggered manner, or may include a plurality of fingerprint detecting units distributed in a central symmetric or axisymmetric manner, which is not specifically limited in the embodiment of the present application.

Each of the plurality of fingerprint detecting units includes a plurality of optical sensing pixels, at least one micro lens and at least one light shielding layer.

In a specific implementation, the at least one micro lens may be disposed above the plurality of optical sensing pixels; and the at least one light shielding layer may be disposed between the at least one micro lens and the plurality of optical sensing pixels, and each of the at least one light shielding layer is provided with an opening corresponding to the plurality of optical sensing pixels. Oblique light signals in multiple directions reflected from a finger above the display screen are respectively transmitted to the plurality of optical sensing pixels through an opening provided in the at least one light shielding layer after being converged by the at least one micro lens, and the oblique light signals are used to detect fingerprint information of the finger.

The oblique light signals in the multiple directions may be incident directions of oblique light with respect to the at least one micro lens. For example, the at least one micro lens may be regarded as a whole; and in this case, in a top view, the multiple directions may be light signals from four directions of up, down, left and right received by the at least one micro lens, and angles of the oblique light signals in these four directions with respect to a plane where the display screen is located may be the same or different. The multiple directions may be directions with respect to the plane where the display screen is located, or directions with respect to three-dimensional space. The multiple directions may be different from each other, or may be partially different.

The micro lens may be various lenses with a convergence function for increasing a field of view and increasing an amount of light signals transmitted to photosensitive pixels. A material of the micro lens may be an organic material such as resin.

The optical sensing pixel may be a photoelectric sensor configured to convert a light signal into an electrical signal. Optionally, the optical sensing pixel may adopt a complementary metal oxide semiconductor (CMOS) device, that is, a semiconductor device composed of a PN junction, and has a unidirectional conductive characteristic. Optionally, the optical sensing pixel has a light sensitivity greater than a first predetermined threshold and quantum efficiency greater than a second predetermined threshold for blue light, green light, red light, or infrared light. For example, the first predetermined threshold may be 0.5 v/lux-sec and the second predetermined threshold may be 40%. That is, the photosensitive pixel has a higher light sensitivity and higher quantum efficiency for blue light (at a wavelength of 460±30 nm), green light (at a wavelength of 540±30 nm), red light or infrared light (at a wavelength greater than or equal to 610 nm) to facilitate detection of corresponding light.

It should be understood that the embodiment of the present application does not limit the specific shapes of the micro lens and the optical sensing pixel. For example, each of the plurality of optical sensing pixels may be a polygonal pixel such as a quadrilateral or hexagonal pixel, or may be a pixel in another shape, such as a circular pixel, so that the plurality of optical sensing pixels have higher symmetry, higher sampling efficiency, equidistant adjacent pixels, better angular resolution, and less aliasing effect.

It should also be understood that the foregoing parameters for the photosensitive pixel may correspond to light required for fingerprint detection. For example, if the light required for fingerprint detection is only light in a wave band, the foregoing parameters for the photosensitive pixel only need to meet requirements of the light in this wave band.

In the embodiment of the present application, signals received by the plurality of optical sensing pixels are oblique light signals in multiple directions, that is, light signals in multiple directions obliquely incident.

When contact between a fingerprint of a dry finger and an OLED screen is bad, contrast of a fingerprint image between a fingerprint ridge and a fingerprint valley in a vertical direction is poor, and the image is too blurred to distinguish the fingerprint pattern. The present application could detect a fingerprint image of the dry finger better while normal finger fingerprints can be acquired better by using a reasonable light path design to allow a light path to receive oblique light signals. In a normal life scene, for example, in a scene such as after washing hands, getting up in the morning, wiping dust with a finger, or at a low temperature, the finger is usually dry, the cuticle is uneven, and when the finger is pressed against the OLED screen, poor contact may occur in some regions of the finger. The occurrence of this case causes a bad effect of the current optical fingerprint solution on fingerprint identification for a dry hand, and the beneficial effect of the present application is to improve a fingerprint imaging effect of a dry hand and make a fingerprint image of the dry hand clear.

In addition, by performing non-directly facing light imaging (that is, oblique light imaging) on the oblique light signals in the multiple directions by the at least one micro lens, a thickness of a light path design (that is, the at least one light shielding layer) of the optical sensing pixel array can be shortened, finally reducing a thickness of the fingerprint detection apparatus effectively. Meanwhile, by imaging the oblique light signals in the multiple directions, an object space numerical aperture of an optical system can be expanded, thereby improving robustness and tolerance of the fingerprint detection apparatus. The numerical aperture may be used to measure an angular range of light that can be captured by the at least one micro lens. In other words, the plurality of optical sensing pixels can further expand an angle of the field of view and the field of view of the fingerprint detecting units by receiving light signals in multiple directions, thereby increasing an angle of the field of view and the field of view of the fingerprint detection apparatus. For example, the field of view of the fingerprint detection apparatus may be expanded from 6×9 mm$^2$ to 7.5×10.5 mm$^2$, which further improves the fingerprint identification effect.

Moreover, by disposing a plurality of optical sensing pixels below the at least one micro lens, when the number of the at least one micro lens is not equal to the number of the plurality of optical sensing pixels, a spatial period of a micro lens (that is, a space between adjacent micro lenses) is not equal to a spatial period of an optical sensing pixel (that is, a space between adjacent optical sensing pixels), thereby avoiding the occurrence of Moire fringes in a fingerprint image and improving the fingerprint identification effect. Particularly, when the number of the at least one micro lens is less than the number of the plurality of optical sensing pixels, the cost of the lens can be reduced and the density of the plurality of optical sensing pixels can be increased, thereby reducing the size and cost of the fingerprint detection apparatus.

Meanwhile, light signals at multiple angles may be multiplexed by a single fingerprint detecting unit (for example, light signals at four angles may be multiplexed by a single micro lens), and segmentation imaging may be performed on light beams at different object space aperture angles, which improves an amount of entering light of the fingerprint detection apparatus effectively, and thus reduces an exposure duration of time of the optical sensing pixels.

Moreover, since the plurality of optical sensing pixels can respectively receive oblique light signals from multiple directions, the plurality of optical sensing pixels may be divided into a plurality of optical sensing pixel groups according to the directions of the oblique light signals, the plurality of optical sensing pixel groups may be respectively used to receive the oblique light signals in the multiple directions, that is, each optical sensing pixel group may generate a fingerprint image based on received oblique light signals, and thus the plurality of optical sensing pixel groups may be used to generate a plurality of fingerprint images. In this case, the plurality of fingerprint images may be superimposed to obtain a fingerprint image with high resolution, and then fingerprint identification is performed based on the fingerprint image with the high resolution, which can improve fingerprint identification performance.

Based on the above analysis, it can be seen that oblique light signals in multiple directions reflected from a finger above the display screen are respectively transmitted to the plurality of optical sensing pixels through an opening provided in the at least one light shielding layer after being converged by the at least one micro lens, which can not only reduce an exposure duration of time of the plurality of optical sensing pixels and a thickness and cost of the fingerprint detection apparatus, but also improve robustness, tolerance, an angle of the field of view and the field of view of the fingerprint detection apparatus, and further improve a fingerprint identification effect, especially a fingerprint identification effect of a dry finger.

A fingerprint detecting unit of the embodiments of the present application will be described hereinafter with reference to the accompanying drawings.

In some embodiments of the present application, a number of the at least micro lens is equal to a number of the plurality of optical sensing pixels, where one micro lens is disposed above each of the plurality of optical sensing pixels.

For example, in one implementation manner, the at least one micro lens is a rectangular array of 2×2 micro lenses, the plurality of optical sensing pixels are a rectangular array of 2×2 optical sensing pixels, and one micro lens is disposed right above each optical sensing pixel in the rectangular array of 2×2 optical sensing pixels.

For another example, in one implementation manner, the at least one micro lens is a rectangular array of 2×2 micro lenses, the plurality of optical sensing pixels are a rectangular array of 2×2 optical sensing pixels, and one micro lens is disposed obliquely above each optical sensing pixel in the rectangular array of 2×2 optical sensing pixels.

As shown in FIG. 5, the fingerprint detecting unit 21 may include four optical sensing pixels 211 and four micro lenses 212 distributed in a rectangular array, where one micro lens 212 is disposed right above each optical sensing pixel 211.

Figure 6:
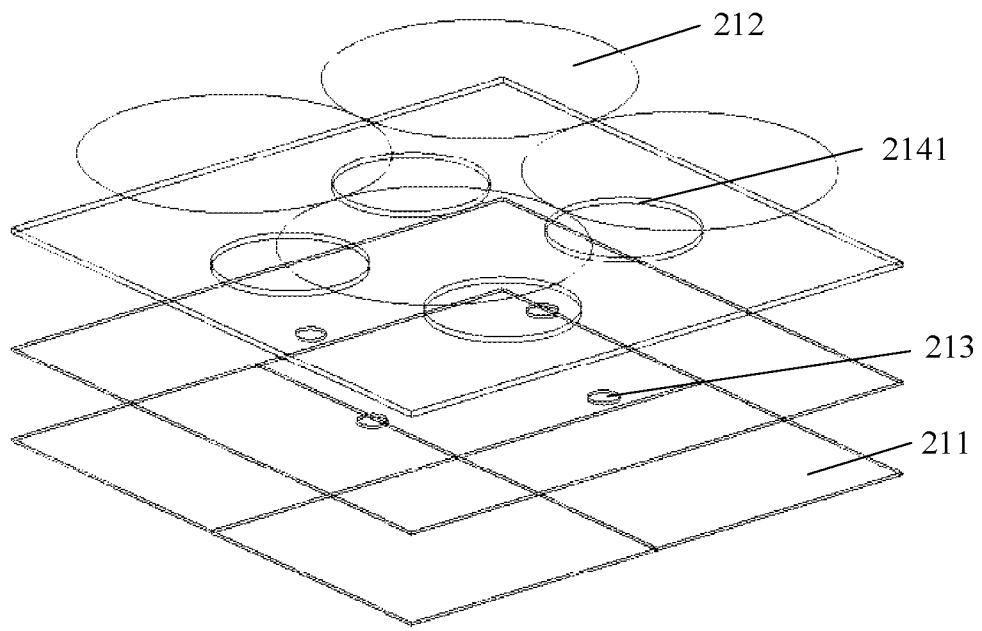

In this case, as shown in FIG. 6, the fingerprint detecting unit 21 may include a top light shielding layer and a bottom light shielding layer. The top light shielding layer may include four openings 2141 respectively corresponding to the four micro lenses 212, and the bottom light shielding layer may include four opening 213 respectively corresponding to the four micro lenses 212.

In one implementation, the rectangular array of 2×2 micro lenses receive the oblique light signals in the multiple directions in a clockwise direction, and each micro lens in the rectangular array of 2×2 micro lenses converges received oblique light signals to an optical sensing pixel below an adjacent micro lens in the clockwise direction; or the rectangular array of 2×2 micro lenses receive the oblique light signals in the multiple directions in a counterclockwise direction, and each micro lens in the rectangular array of 2×2 micro lenses converges received oblique light signals to an optical sensing pixel below an adjacent micro lens in the counterclockwise direction.

Figures 7, 8:
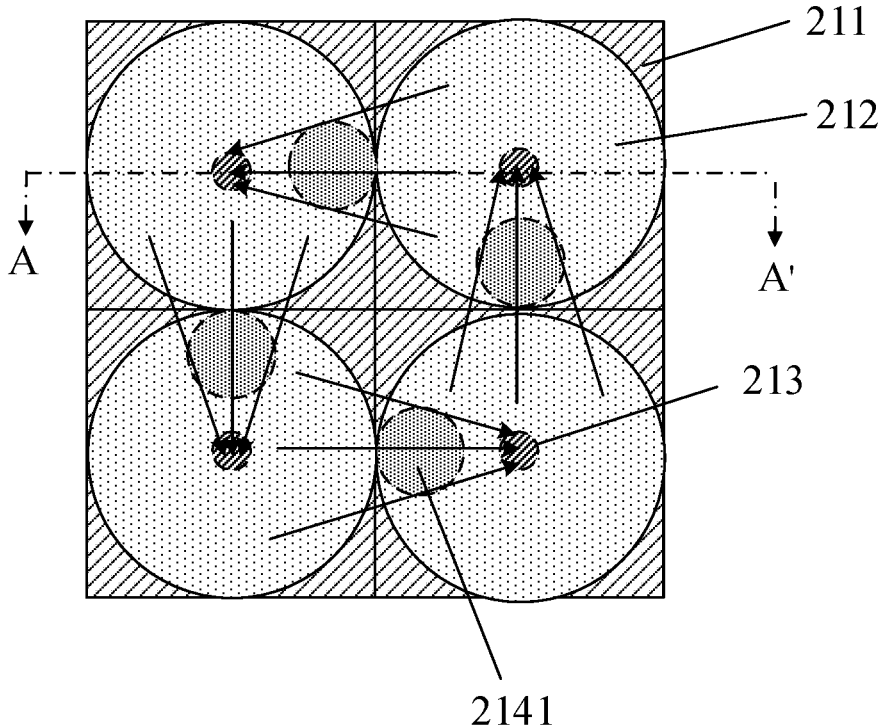

For example, as shown in FIG. 7, the four micro lenses 212 may converge oblique light signals in multiple directions respectively to the four optical sensing pixels 211 along the following paths:

the micro lens 212 at the upper right corner converges received oblique light signals to the optical sensing pixel 211 at the upper left corner, the micro lens 212 at the upper left corner converges received oblique light signals to the optical sensing pixel 211 at the lower left corner, the micro lens 212 at the lower left corner converges received oblique light signals to the optical sensing pixel 211 at the lower right corner, and the micro lens 212 at the lower right corner converges received oblique light signals to the optical sensing pixel 211 at the upper right corner.

Accordingly, when the fingerprint detection apparatus includes a plurality of fingerprint detecting units distributed in an array, a plurality of fingerprint images may be generated based on received light signals in multiple directions, and then a fingerprint image with high resolution is obtained to improve the fingerprint identification effect.

For example, a rectangular array of 4×4 fingerprint detecting units may include optical sensing pixel arrays as shown in FIG. 8, where "1" represents an optical sensing pixel for receiving an oblique light signal in a first direction, "2" represents an optical sensing pixel for receiving an oblique light signal in a second direction, "3 represents an optical sensing pixel for receiving an oblique light signal in a third direction, and "4" represents an optical sensing pixel for receiving an oblique light signal in a fourth direction. That is, the optical sensing pixels represented by "1", "2", "3" and "4" each may be used to generate a fingerprint image, that is, a total of four fingerprint images may be generated, and these four fingerprint images may be used to merge into a fingerprint image with high resolution, thereby improving the identification effect of the fingerprint detection apparatus.

With reference to FIG. 7, the first direction may be a direction of the oblique light signals received by the micro lens 212 at the lower right corner, the second direction may be a direction of the oblique light signals received by the micro lens 212 at the upper right corner, the third direction may be a direction of the oblique light signals received by the micro lens 212 at the upper left corner, and the fourth direction may be a direction of the oblique light signals received by the micro lens 212 at the lower left corner.

Figure 9:
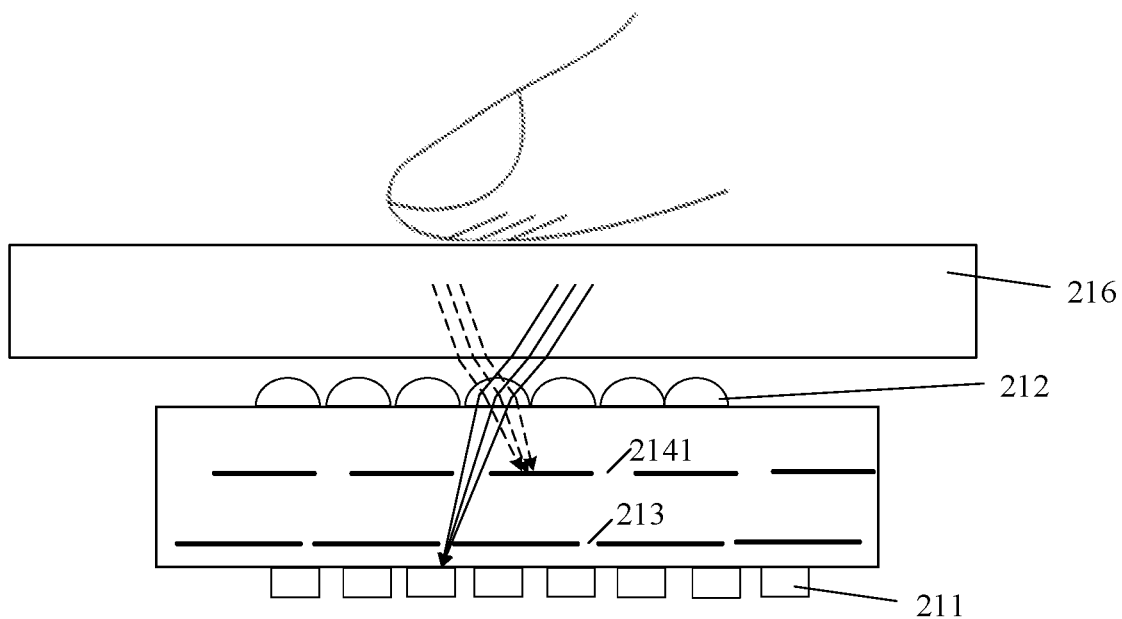

FIG. 9 is a side view of a fingerprint detection apparatus located under a display screen.

As shown in FIG. 9, the fingerprint detection apparatus may include micro lenses 212 distributed in an array, a top light shielding layer and a bottom light shielding layer located below the micro lenses 212, and optical sensing pixels distributed in an array and located below the bottom light shielding layer, where for each micro lens 212, the top light shielding layer and the bottom light shielding layer are respectively provided with a corresponding opening 2141 and opening 213. The fingerprint identification apparatus is disposed under a display screen 216.

Each micro lens 212 converges received oblique light signals in specific directions (light signals shown by solid lines in the drawing) to a corresponding optical sensing pixel through a corresponding opening 2141 and opening 213, and transmits received oblique light signals in non-specific directions (light signals shown by dashed lines in the drawing) to regions of the light shielding layers other than the openings 2141 and the openings 214 to avoid the received oblique light signals in non-specific directions from being received by other optical sensing pixels, thereby achieving segmentation imaging of a fingerprint image.

Figure 10:
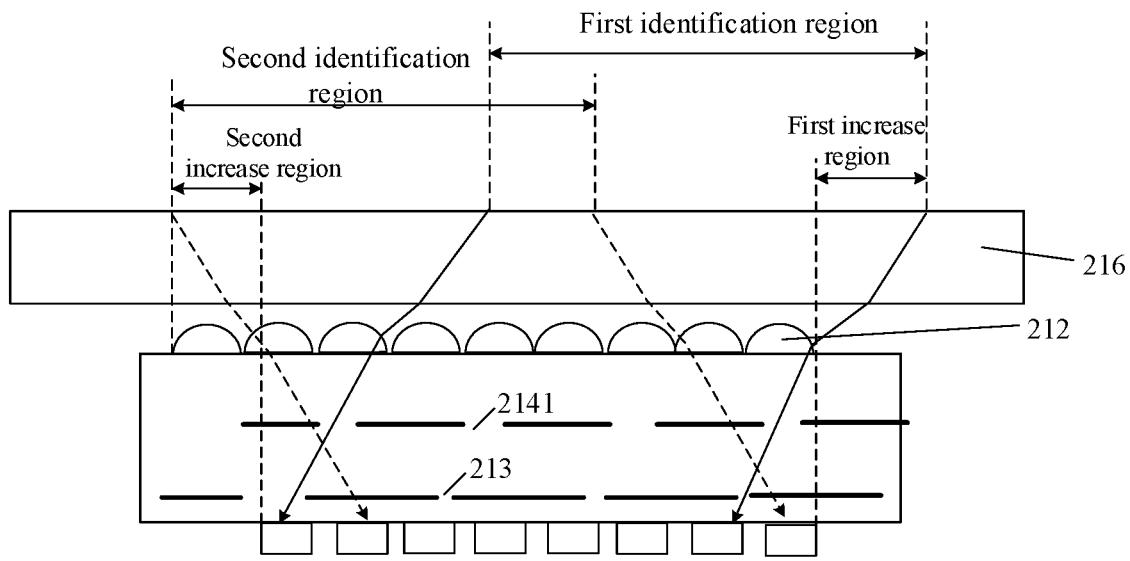

FIG. 10 is a schematic diagram of light paths for oblique light signals in two directions according to an embodiment of the present application.

With reference to FIG. 7, FIG. 10 may be a schematic side cross-sectional view of a fingerprint detection apparatus including the fingerprint detecting unit shown in FIG. 7 in an A-A' direction. In this case, one micro lens 212 in the fingerprint detecting unit (for example, the micro lens 212 at the upper right corner shown in FIG. 7) converges a received oblique light signal (a light signal shown by a solid line in FIG. 10) in one direction (that is, the second direction) to a corresponding optical sensing pixel (for example, the optical sensing pixel 211 at the upper left corner shown in FIG. 7) through a corresponding opening 2141 and opening 213, and another micro lens 212 in the fingerprint detecting unit (for example, the micro lens 212 at the lower left corner shown in FIG. 7) converges a received oblique light signal (a light signal shown by a dashed line in FIG. 10) in another direction (that is, the fourth direction) to a corresponding optical sensing pixel (for example, the optical sensing pixel 211 at the lower right corner shown in FIG. 7) through a corresponding opening 2141 and opening 213.

For example, as shown in FIG. 10, a fingerprint identification region of the fingerprint detection apparatus including a plurality of fingerprint detecting units includes a first fingerprint identification region and a second fingerprint identification region, where a fingerprint identification region corresponding to the micro lens 212 for converging the oblique light signal in the second direction is the first fingerprint identification region, and a fingerprint identification region corresponding to the micro lens for converging the oblique light signal in the fourth direction is the second fingerprint identification region. The first fingerprint identification region is offset to right by a first increase region relative to an array formed by the optical sensing pixels, and the second fingerprint identification region is offset to left by a second increase region relative to the array formed by the optical sensing pixels.

In other words, relative to a fingerprint detection apparatus that only receives oblique light signals in one direction, the fingerprint identification region of the fingerprint detection apparatus provided in the embodiment of the present application additionally includes the first increase region and the second increase region, which effectively increases a visible region (that is, the field of view). In addition, an overlapping region between the first fingerprint identification region and the second fingerprint identification region could effectively improve image resolution of a fingerprint image, and further improve the fingerprint identification effect.

It should be understood that the light path design shown in FIG. 7 is only an example of the present application and should not be understood as limitation to the present application In another implementation, the rectangular array of 2×2 micro lenses receive the oblique light signals in the multiple directions in a diagonal direction of the rectangular array of 2×2 micro lenses, and each micro lens in the rectangular array of 2×2 micro lenses converges received oblique light signals to an optical sensing pixel below an adjacent micro lens in the diagonal direction.

Figure 11:
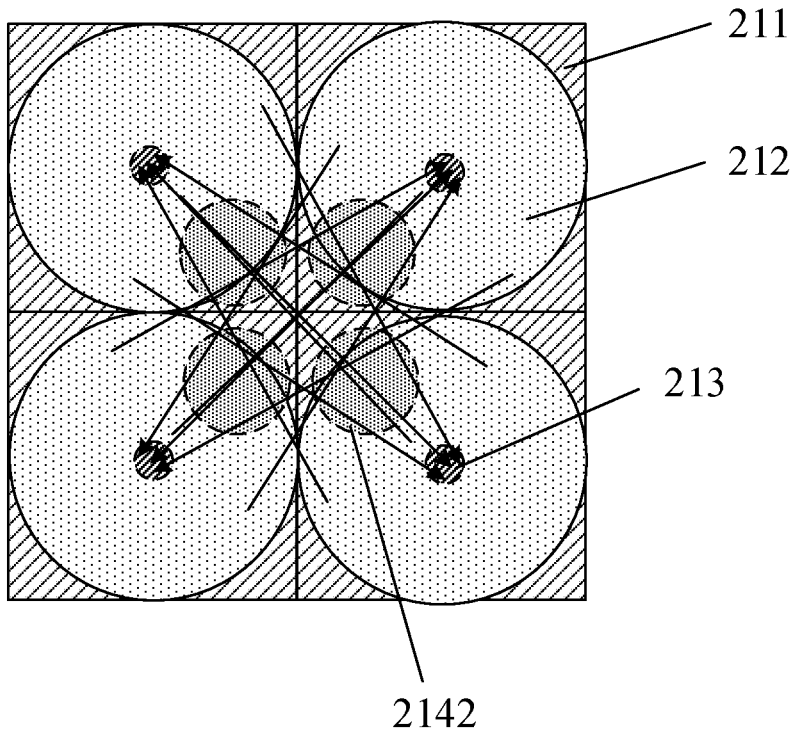
Figure 12:
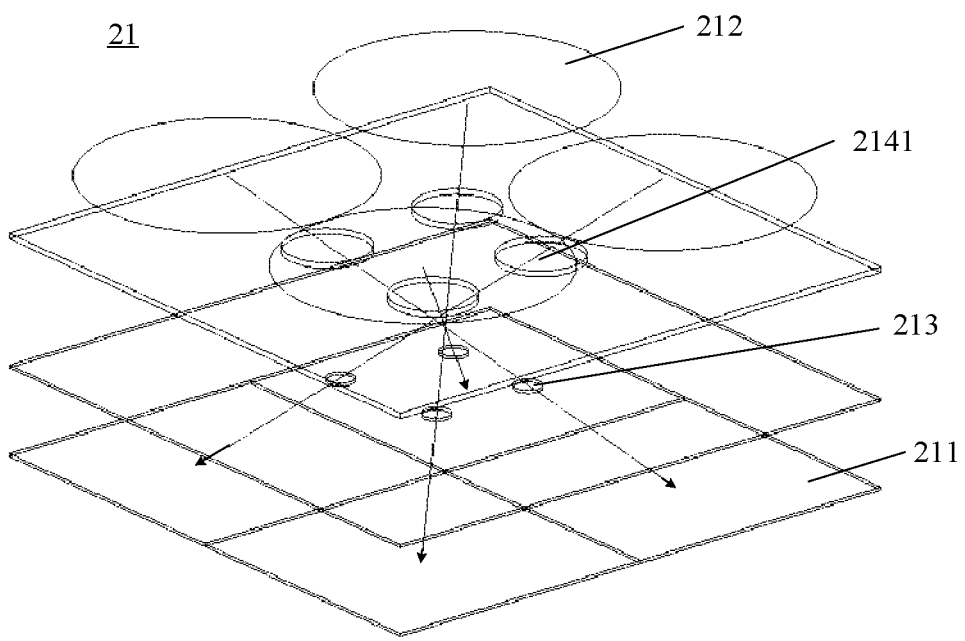

For example, as shown in FIG. 11 and FIG. 12, the four micro lenses 212 may converge oblique light signals in multiple directions respectively to the four optical sensing pixels 211 along the following paths:

the micro lens 212 at the upper right corner converges received oblique light signals to the optical sensing pixel 211 at the lower left corner, the micro lens 212 at the lower left corner converges received oblique light signals to the optical sensing pixel 211 at the upper right corner, the micro lens 212 at the upper left corner converges received oblique light signals to the optical sensing pixel 211 at the lower right corner, and the micro lens 212 at the lower right corner converges received oblique light signals to the optical sensing pixel 211 at the upper left corner.

Accordingly, when the fingerprint detection apparatus includes a plurality of fingerprint detecting units distributed in an array, a plurality of fingerprint images may be generated based on received light signals in multiple directions, and then a fingerprint image with high resolution is obtained to improve the fingerprint identification effect.

Similarly, a rectangular array of 4×4 fingerprint detecting units may include optical sensing pixel arrays as shown in FIG. 8, where "1" represents an optical sensing pixel for receiving an oblique light signal in a first direction, "2" represents an optical sensing pixel for receiving an oblique light signal in a second direction, "3 represents an optical sensing pixel for receiving an oblique light signal in a third direction, and "4" represents an optical sensing pixel for receiving an oblique light signal in a fourth direction. That is, the optical sensing pixels represented by "1", "2", "3" and "4" each may be used to generate a fingerprint image, that is, a total of four fingerprint images may be generated, and these four fingerprint images may be used to merge into a fingerprint image with high resolution, thereby improving the identification effect of the fingerprint detection apparatus.

With reference to FIG. 11, the first direction may be a direction of the oblique light signals received by the micro lens 212 at the lower left corner, the second direction may be a direction of the oblique light signals received by the micro lens 212 at the lower right corner, the third direction may be a direction of the oblique light signals received by the micro lens 212 at the upper right corner, and the fourth direction may be a direction of the oblique light signals received by the micro lens 212 at the upper left corner.

It should be understood that, in the embodiment of the present application, the fingerprint detecting unit includes at least one light shielding layer and a plurality of optical sensing pixels, where each of the at least one light shielding layer is provided with an opening corresponding to the plurality of optical sensing pixels. For example, the at least one light shielding layer may be a plurality of light shielding layers, and a top light shielding layer of the plurality of light shielding layers may be provided with at least one opening corresponding to the plurality of optical sensing pixels. For example, a top light shielding layer of the plurality of light shielding layers may be provided with one opening corresponding to the plurality of optical sensing pixels. For another example, a top light shielding layer of the plurality of light shielding layers may be provided with a plurality of openings respectively corresponding to the plurality of optical sensing pixels.

For example, as shown in FIG. 12, the at least one light shielding layer may include a top light shielding layer and a bottom light shielding layer, where the top light shielding layer is provided with four openings 2141 respectively corresponding to four optical sensing pixels. The bottom light shielding layer is provided with four openings 213 respectively corresponding to the four optical sensing pixels.

Figure 13:
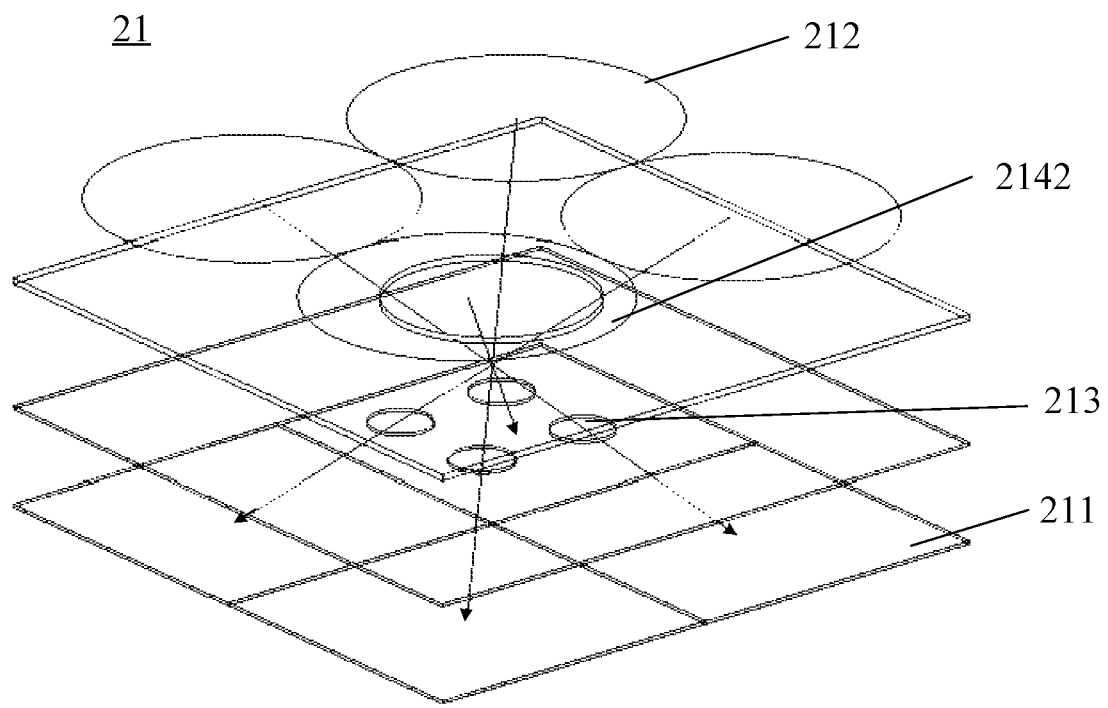

For example, as shown in FIG. 13, the at least one light shielding layer may include a top light shielding layer and a bottom light shielding layer, where the top light shielding layer is provided with one opening 2142 corresponding to four optical sensing pixels. The bottom light shielding layer is provided with four openings 213 respectively corresponding to the four optical sensing pixels.

It should be understood that the openings provided in the light shielding layers in FIG. 12 and FIG. 13 are described only by an example of the fingerprint detecting unit shown in FIG. 11, and the implementation manners thereof are applicable to various embodiments of the present application, which is not limited in the present application.

For example, the at least one light shielding layer may be light shielding layers more than 2 layers.

It should also be understood that FIG. 5 to FIG. 13 are only examples that one micro lens is disposed above each optical sensing pixel and should not be understood as limitation to the present application. For example, the fingerprint detecting unit may further include other numbers or other arrangements of micro lenses or optical sensing pixels.

For example, in another implementation manner, the at least one micro lens is multiple rows of micro lenses, and the plurality of optical sensing pixels are multiple rows of optical sensing pixels corresponding to the multiple rows of micro lenses, where each row of optical sensing pixels in the multiple rows of optical sensing pixels is disposed below a corresponding row of micro lenses in a dislocated manner.

Optionally, the multiple rows of micro lenses may be multiple columns or lines of micro lenses.

The at least one light shielding layer may be provided with a corresponding light path design so that the multiple rows of micro lenses receive the oblique light signals in the multiple directions in a dislocation direction of the multiple rows of optical sensing pixels, and each row of micro lenses in the multiple rows of micro lenses converges received oblique light signals to optical sensing pixels below a same row of micro lenses or adjacent micro lenses.

Figure 14:
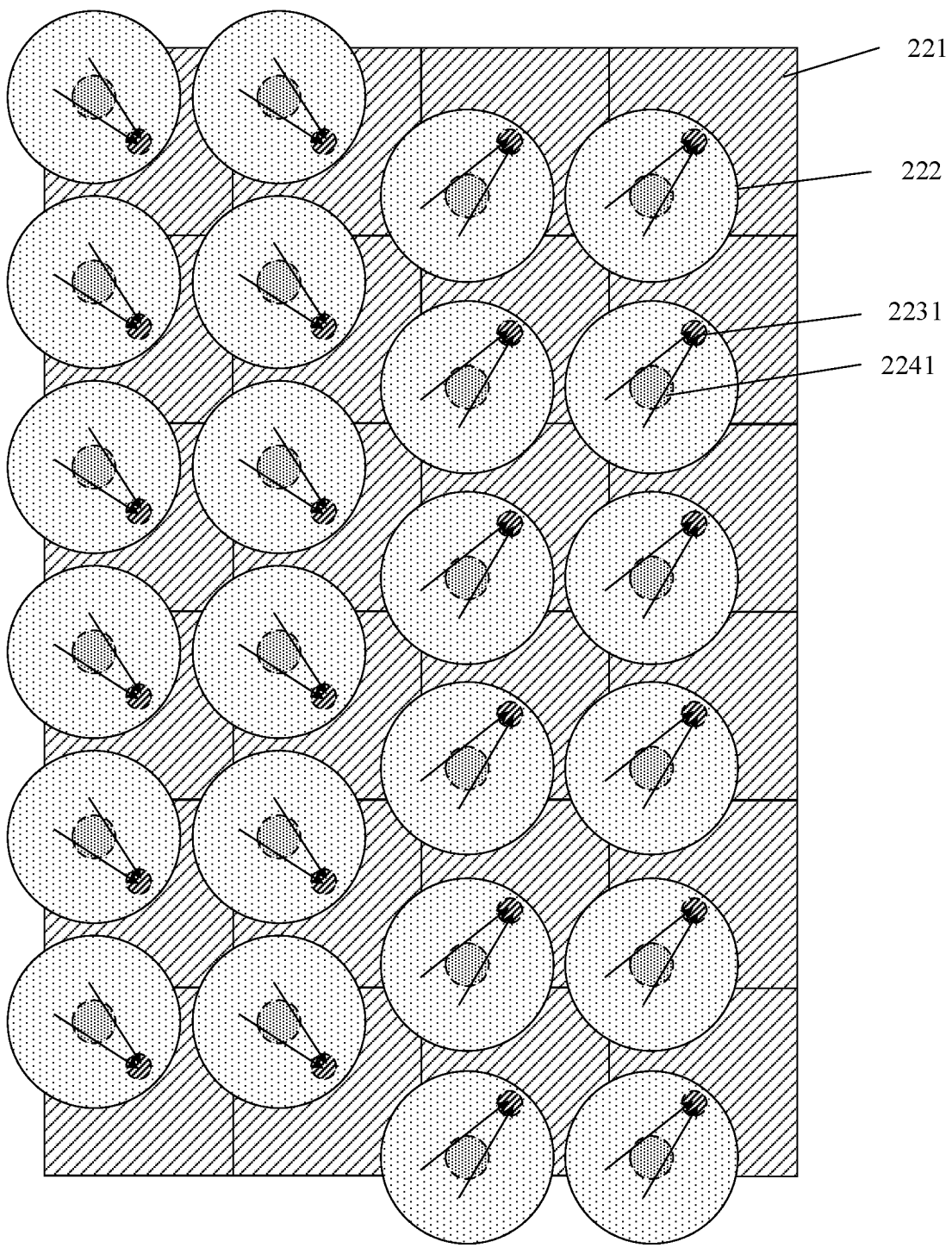

For example, as shown in FIG. 14, a fingerprint detecting unit 22 may include four columns of optical sensing pixels distributed in a rectangular array and four columns of micro lenses corresponding to the four columns of optical sensing pixels, where each column of optical sensing pixels in the four columns of optical sensing pixels includes six optical sensing pixels 211, each column of micro lenses in the four columns of micro lenses includes six micro lenses 222, and one optical sensing pixel 221 is disposed below one micro lens 222 in a dislocated manner.

For example, the fingerprint detecting unit 22 may include a top light shielding layer and a bottom light shielding layer. In this case, for each micro lens 222, the top light shielding layer and the bottom light shielding layer may be provided with a corresponding opening 2241 and opening 2231, respectively. Each micro lens 222 in each row of micro lenses in the multiple rows of micro lenses may converge received light signals to an optical sensing pixel 221 obliquely below a same micro lens 222 through a corresponding opening 2241 and opening 2231.

Accordingly, when the fingerprint detection apparatus includes a plurality of fingerprint detecting units distributed in an array, a plurality of fingerprint images may be generated based on received light signals in multiple directions, and then a fingerprint image with high resolution is obtained to improve the fingerprint identification effect.

Figure 15:
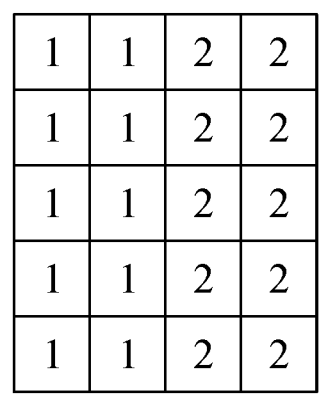

For example, the fingerprint detecting unit shown in FIG. 14 may include an optical sensing pixel array as shown in FIG. 15, where "1" represents an optical sensing pixel for receiving an oblique light signal in a first direction, and "2" represents an optical sensing pixel for receiving an oblique light signal in a second direction. That is, the optical sensing pixels represented by "1" and "2" each may be used to generate a fingerprint image, that is, a total of two fingerprint images may be generated, and these two fingerprint images may be used to merge into a fingerprint image with high resolution, thereby improving the identification effect of the fingerprint detection apparatus.

With reference to FIG. 14, based on an order from left to right, the first direction may be a direction of oblique light signals received by micro lenses in the first and second columns of micro lenses, and the second direction may be a direction of oblique light signals received by micro lenses in the third and fourth columns of micro lenses.

Optionally, in one embodiment of the present application, a projection of each micro lens in each row of micro lenses in the multiple rows of micro lenses on a plane where the display screen is located is a circle, and a projection of each optical sensing pixel in each row of optical sensing pixels in the multiple rows of optical sensing pixels on the plane where the display screen is located is a rectangle. A projection of a center of each optical sensing pixel in each row of optical sensing pixels in the multiple rows of optical sensing pixels on the plane where the display screen is located, relative to a projection of a center of a corresponding micro lens on the plane where the display screen is located, is offset by a preset distance in a dislocation direction of the multiple rows of optical sensing pixels, and the preset distance is less than or equal to a side length of the rectangle, or the preset distance is less than or equal to a diameter of the circle.

For example, as shown in FIG. 14, the dislocation direction is a diagonal direction of each optical sensing pixel in each row of optical sensing pixels in the multiple rows of optical sensing pixels, that is, each optical sensing pixel 221 in each row of optical sensing pixels in the multiple rows of optical sensing pixels is offset by a preset distance in a diagonal direction of a same optical sensing pixel 221.

In this case, a corresponding opening 2241 and opening 2231 are disposed above each optical sensing pixel 221 in each row of optical sensing pixels in the multiple rows of optical sensing pixels, that is, at least one light shielding layer in the fingerprint detecting unit 22 is provided with a corresponding opening above each optical sensing pixel 221.

It should be understood that the preset distance may also be an offset distance in a direction where a side of the optical sensing pixel 221 is located, for example, two sides of the optical sensing pixel 221 are an X-axis direction and a Y-axis direction, where the preset distance may include an offset distance in the X-axis direction and an offset distance in the Y-axis direction. For example, assuming that a side length of the optical sensing pixel is 12.5 mm and a diameter of the micro lens is 11.5 mm, the offset distance in the X-axis direction may be 4-5 mm and the offset distance in the Y-axis direction may be 4-5 mm. Certainly, the foregoing parameters are merely examples and should not be understood as limitation to themselves. For example, the offset distance in the X-axis direction may be not equal to the offset distance in the Y-axis direction. For another example, the offset distance in the X-axis direction or the offset distance in the Y-axis direction may be greater than 5 mm or less than 4 mm.

Figure 16:
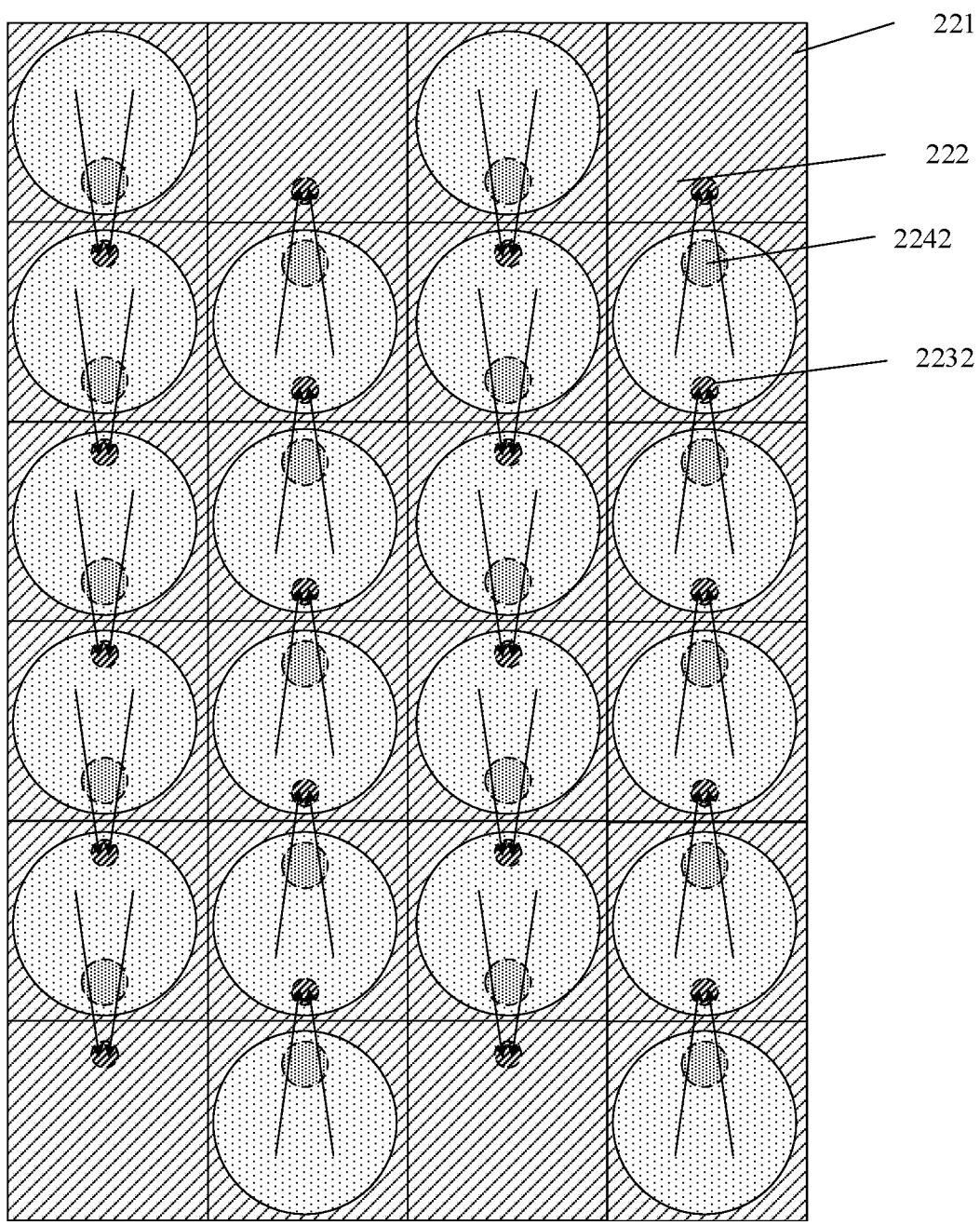

Certainly, FIG. 14 is only an example of offset of the multiple rows of optical sensing pixels in the embodiment of the present application and should not be understood as limitation to the present application For example, as shown in FIG. 16, the dislocation direction is a direction where a vertical side of each optical sensing pixel in each row of optical sensing pixels in the multiple rows of optical sensing pixels is located. The vertical side may be a direction parallel to an arrangement direction of the optical sensing pixels.

For example, the fingerprint detecting unit 22 may include a top light shielding layer and a bottom light shielding layer. In this case, for each micro lens 222, the top light shielding layer and the bottom light shielding layer may be provided with a corresponding opening 2242 and opening 2232, respectively. Each micro lens 222 in each row of micro lenses in the multiple rows of micro lenses may converge received oblique light signals to an optical sensing pixel 221 right below an adjacent micro lens 222 through a corresponding opening 2242 and opening 2232. For example, the micro lens 222 at the upper left corner may converge received oblique light signals to an optical sensing pixel 221 right below an adjacent micro lens 222 in the first column and second line.

In this case, the bottom light shielding layer may be provided with a corresponding opening 2232 above each optical sensing pixel 221 in each row of optical sensing pixels in the multiple rows of optical sensing pixels, and the top light shielding layer may be provided with a corresponding opening 2242 above an optical sensing pixel 221 adjacent to a same optical sensing pixel 221.

Certainly, in other alternative embodiments, the dislocation direction may also be other directions. For example, the dislocation direction is a direction where a horizontal side of each optical sensing pixel in each row of optical sensing pixels in the multiple rows of optical sensing pixels is located. The horizontal side may be a direction perpendicular to an arrangement direction of the optical sensing pixels.

In some other embodiments of the present application, a number of the at least micro lens is less than a number of the plurality of optical sensing pixels.

In one implementation manner, the at least one micro lens is one micro lens, and the plurality of optical sensing pixels are a rectangular array of 2×2 optical sensing pixels, where the one micro lens is disposed right above the rectangular array of 2×2 optical sensing pixels.

Figure 17:
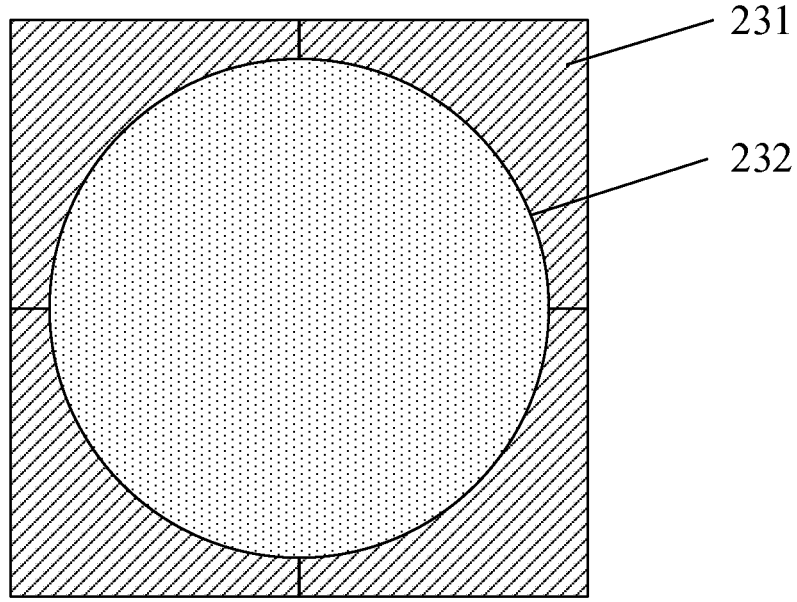

For example, as shown in FIG. 17, a fingerprint detection apparatus 23 may include one micro lens 232 and four optical sensing pixels 231 distributed in a rectangular array.

In a specific implementation, at least one light shielding layer in the fingerprint detection apparatus 23 may be respectively provided with openings corresponding to the four optical sensing pixels 231 below the one micro lens so that the one micro lens may receive the oblique light signals in the multiple directions in a diagonal direction of the rectangular array of 2×2 optical sensing pixels, and the one micro lens may converge the oblique light signals in the multiple directions respectively to optical sensing pixels in the rectangular array of 2×2 optical sensing pixels in the diagonal direction to increase an amount of signals that can be received by each optical sensing pixel, thereby improving the fingerprint identification effect.

Figure 18:
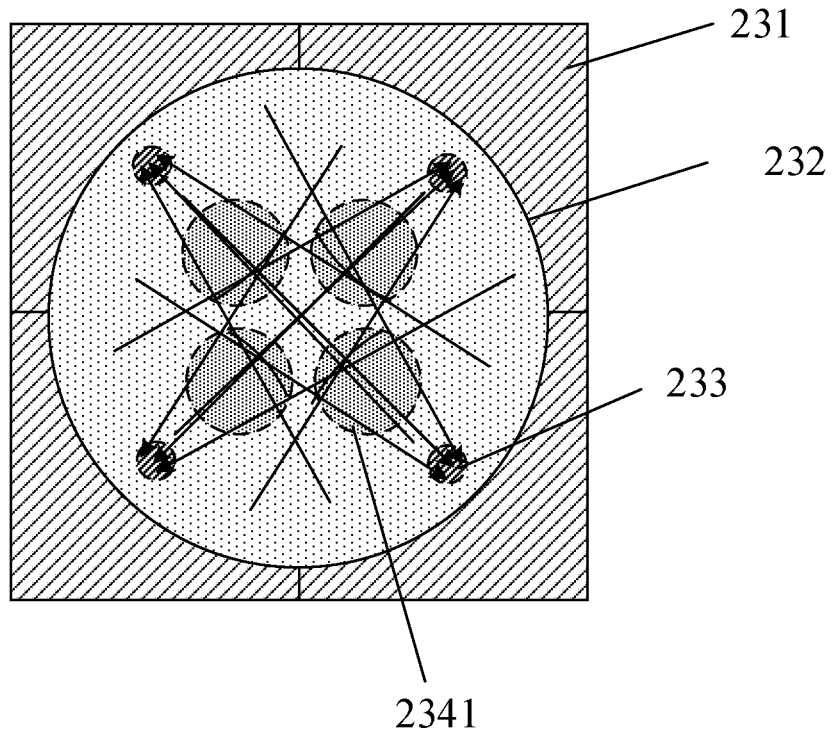
Figure 19:
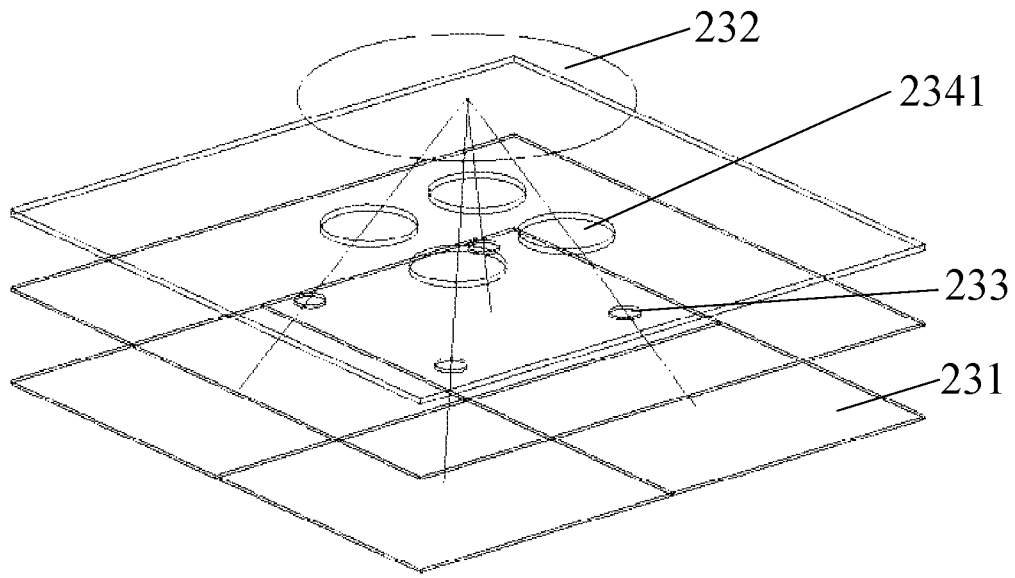

For example, as shown in FIG. 18 and FIG. 19, the at least one light shielding layer may include a top light shielding layer and a bottom light shielding layer. The top light shielding layer is provided with openings 2341 respectively corresponding to the four optical sensing pixels 231 below the one micro lens 232, and the bottom light shielding layer is provided with openings 233 respectively corresponding to the four optical sensing pixels 231 below the one micro lens 232. The one micro lens 222 converges received light signals in multiple directions respectively to the four optical sensing pixels 231 through the corresponding openings 2341 and openings 233.

Figure 20:
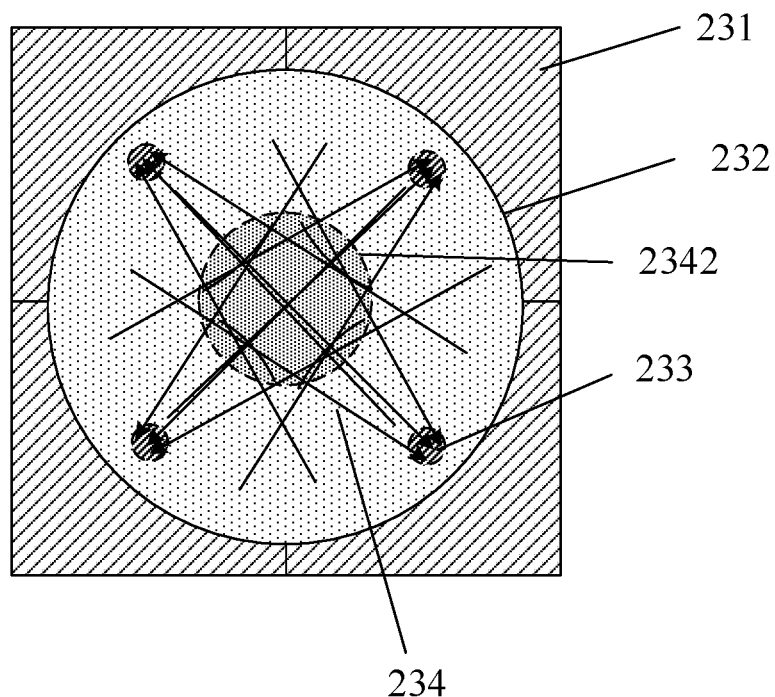
Figure 21:
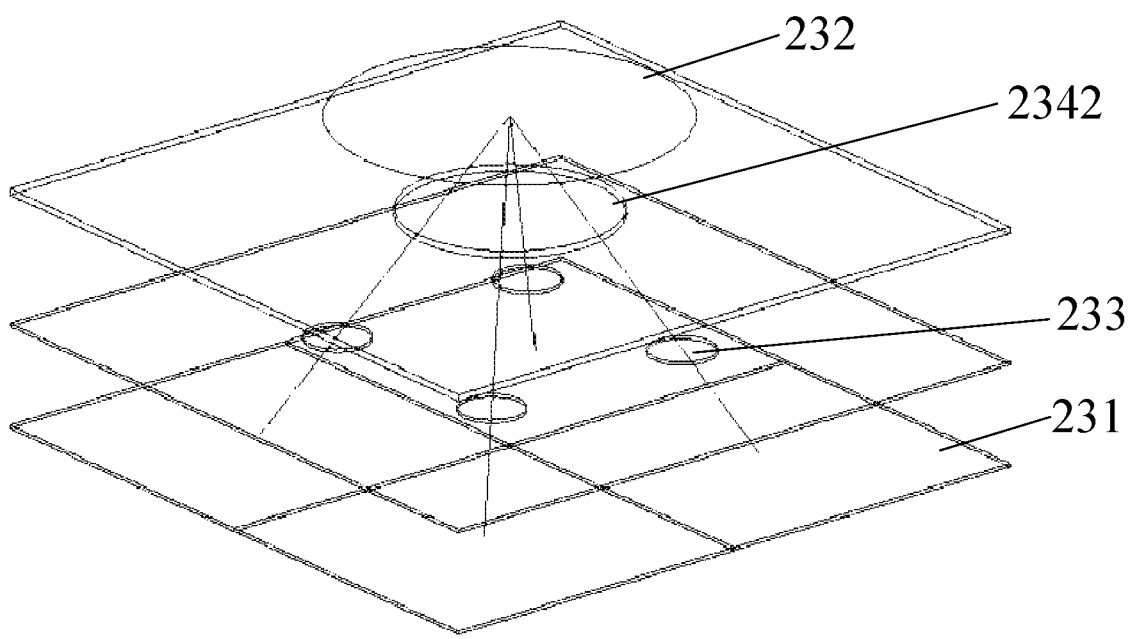

Certainly, four small holes of the top light shielding layer corresponding to the four optical sensing pixels 231 may also merge into one large hole, such as an opening 2342 shown in FIG. 20 and FIG. 21.

In another implementation manner, the at least one micro lens is a rectangular array of 2×2 micro lenses, the plurality of optical sensing pixels are a rectangular array of 3×3 optical sensing pixels, and one micro lens is disposed right above every four adjacent optical sensing pixels in the rectangular array of 3×3 optical sensing pixels. For example, one micro lens is disposed right above a center position of every four adjacent optical sensing pixels in the rectangular array of 3×3 optical sensing pixels.

Figure 22:
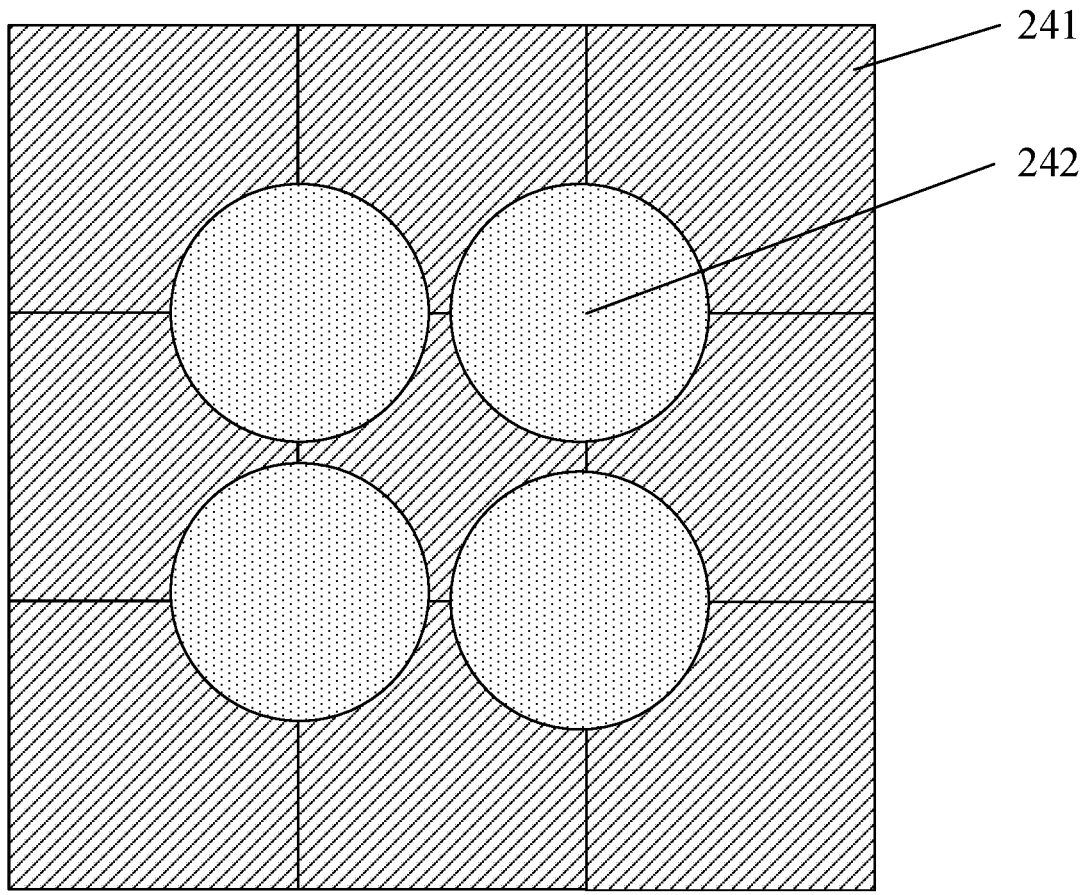

For example, as shown in FIG. 22, a fingerprint detection apparatus 24 may include four micro lenses 242 distributed in a rectangular array and nine optical sensing pixels 241 distributed in a rectangular array.

In a specific implementation, at least one light shielding layer in the fingerprint detection apparatus 24 may be respectively provided with openings corresponding to optical sensing pixels 241 at four corners of the rectangular array of 3×3 optical sensing pixels so that each micro lens 242 in the rectangular array of 2×2 micro lenses may converge received oblique light signals to an optical sensing pixel 241 in the optical sensing pixels 241 at the four corners of the rectangular array of 3×3 optical sensing pixels that is closest to a same micro lens 242.

Figure 23:
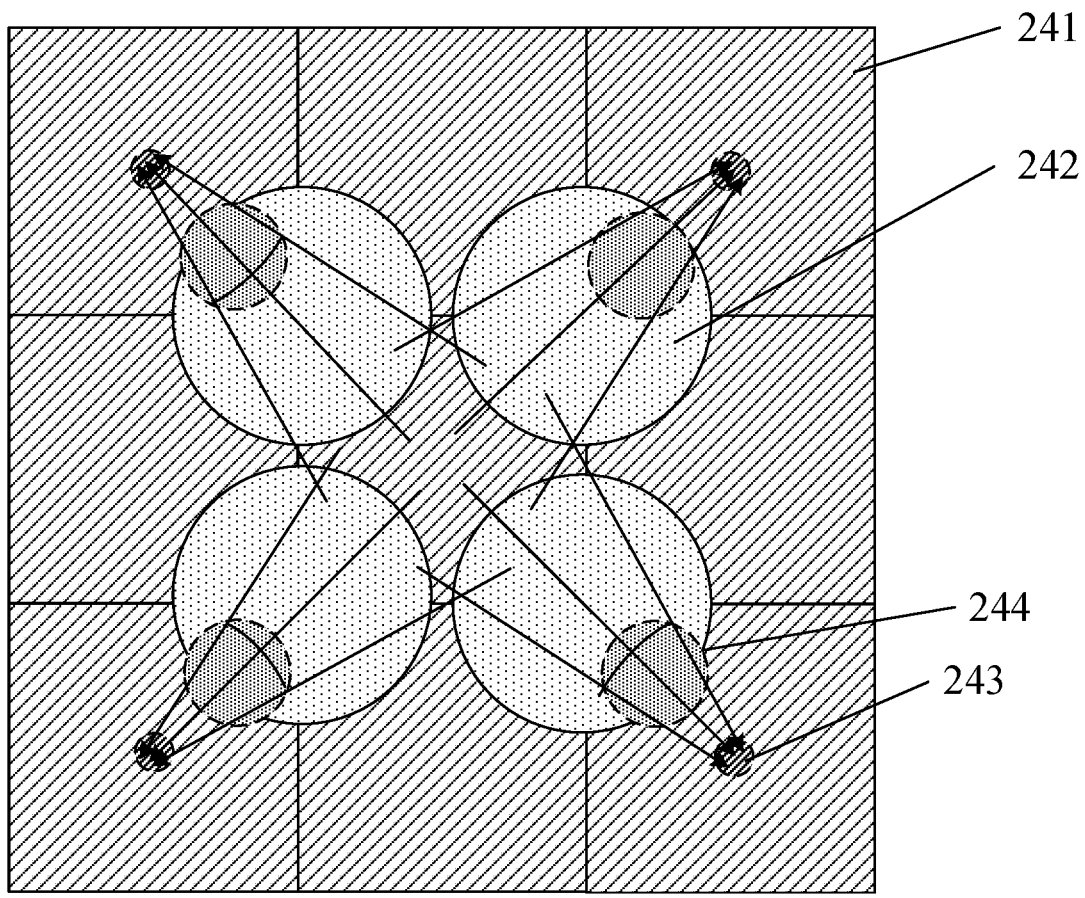

For example, as shown in FIG. 23, the at least one light shielding layer may include a top light shielding layer and a bottom light shielding layer. The top light shielding layer is provided with openings 244 respectively corresponding to the optical sensing pixels 241 at the four corners, and the bottom light shielding layer is provided with openings 243 respectively corresponding to the optical sensing pixels 241 at the four corners. Accordingly, the four micro lenses 242 may converge the oblique light signals in the multiple directions respectively to the optical sensing pixels 241 at the four corners through the corresponding openings 244 and openings 243.

Since only optical sensing pixels 241 at the four corners in the rectangular array of 3×3 optical sensing pixels will receive oblique light signals for detecting fingerprint information, in order to increase utilization of the optical sensing pixels, in some embodiments of the present application, a fingerprint detection apparatus including a plurality of fingerprint detecting units 24 may be formed by means of a staggered arrangement.

Figures 24, 25:
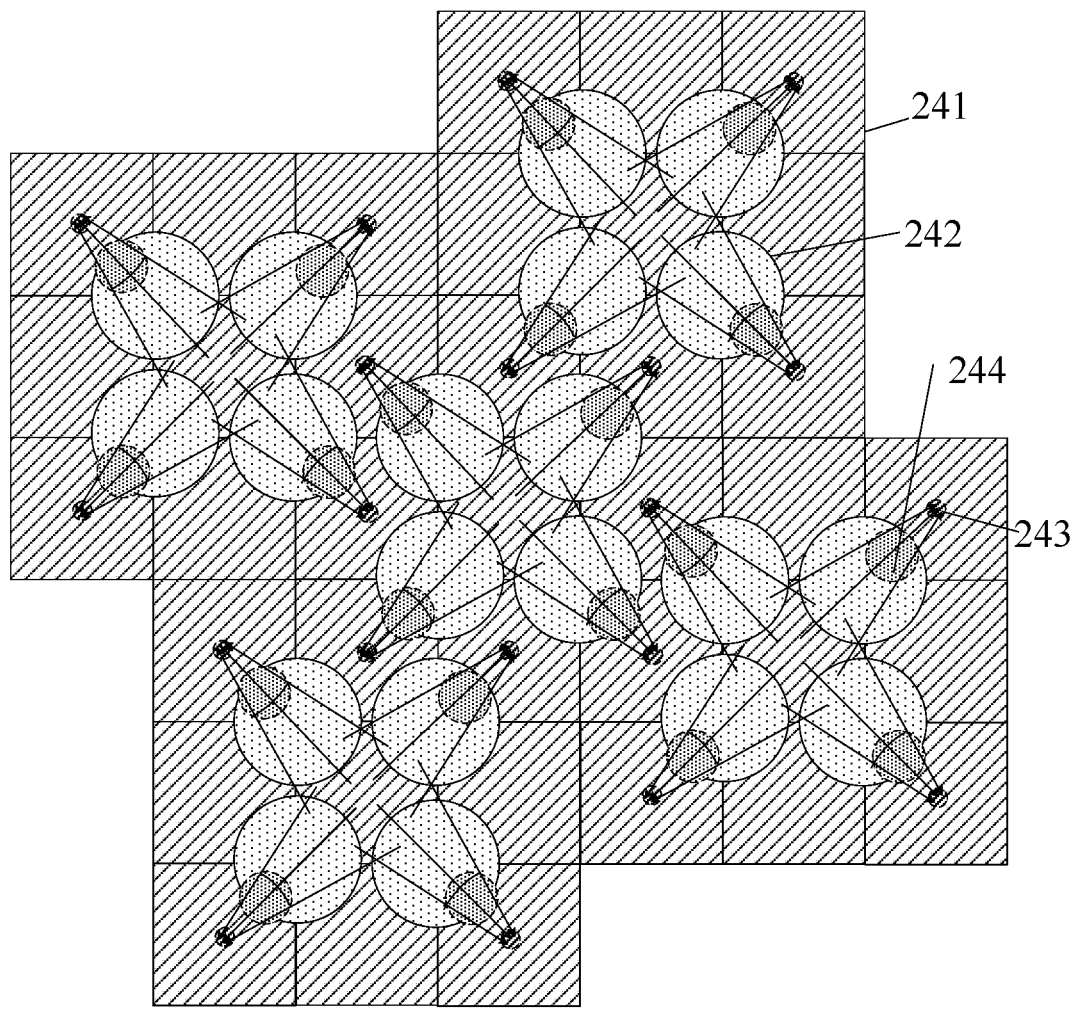

For example, as shown in FIG. 24, for a central fingerprint detecting unit located at a middle position, an optical sensing pixel 241 between an optical sensing pixel 241 at the upper left corner and an optical sensing pixel 241 at the upper right corner may be multiplexed as an optical sensing pixel 241 located at the lower left corner of another fingerprint detecting unit, an optical sensing pixel 241 between the optical sensing pixel 241 at the upper left corner and an optical sensing pixel 241 at the lower left corner of the central fingerprint detecting unit may be multiplexed as an optical sensing pixel 241 located at the lower right corner of another fingerprint detecting unit, an optical sensing pixel 241 between the optical sensing pixel 241 at the lower left corner and an optical sensing pixel 241 at the lower right corner of the central fingerprint detecting unit may be multiplexed as an optical sensing pixel 241 located at the upper right corner of another fingerprint detecting unit, and an optical sensing pixel 241 between the optical sensing pixel 241 at the lower right corner and the optical sensing pixel 241 at the upper right corner of the central fingerprint detecting unit may be multiplexed as an optical sensing pixel 241 located at the upper left corner of another fingerprint detecting unit.

Therefore, the fingerprint detection apparatus may include a plurality of optical sensing pixels as shown in FIG. 25, where "0" represents an optical sensing pixel not for receiving a light signal, and "1", "2", "3" and "4" respectively represent optical sensing pixels for receiving light signals in four different directions. That is, the optical sensing pixels represented by "1", "2", "3" and "4" each may be used to generate a fingerprint image, that is, a total of four fingerprint images may be generated, and these four fingerprint images may be used to merge into a fingerprint image with high resolution, thereby improving the identification effect of the fingerprint detection apparatus.

In another implementation manner, the at least one micro lens is a rectangular array of 3×3 micro lenses, the plurality of optical sensing pixels are a rectangular array of 4×4 optical sensing pixels, and one micro lens is disposed right above every four adjacent optical sensing pixels in the rectangular array of 4×4 optical sensing pixels.

Figure 26:
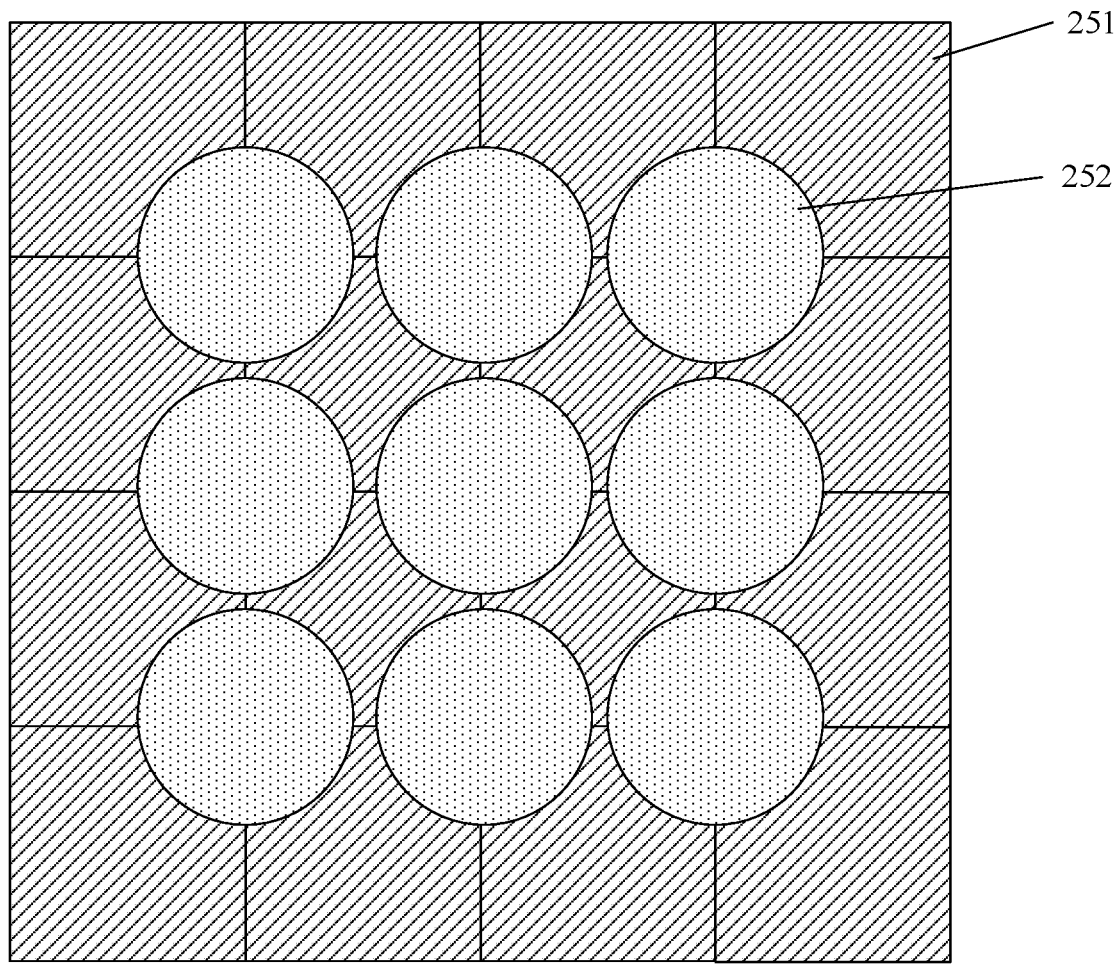

For example, as shown in FIG. 26, a fingerprint detection apparatus 25 may include nine micro lenses 252 distributed in a rectangular array and 16 optical sensing pixels 251 distributed in a rectangular array. One micro lens 252 is disposed right above every four adjacent optical sensing pixels 251 in the 16 optical sensing pixels 251.

In a specific implementation, at least one light shielding layer in the fingerprint detection apparatus 25 may be respectively provided with openings corresponding to the 16 optical sensing pixels 251 so that a central micro lens in the rectangular array of 3×3 micro lenses converges received oblique light signals respectively to four optical sensing pixels below the central micro lens, each of micro lenses at four corners in the rectangular array of 3×3 micro lenses converges received oblique light signals to an optical sensing pixel located at a corner of the rectangular array of 4×4 optical sensing pixels below a same micro lens, and each of the other micro lenses in the rectangular array of 3×3 micro lenses converges received oblique light signals to two optical sensing pixels on an outer side below a same micro lens.

Figures 27, 28:
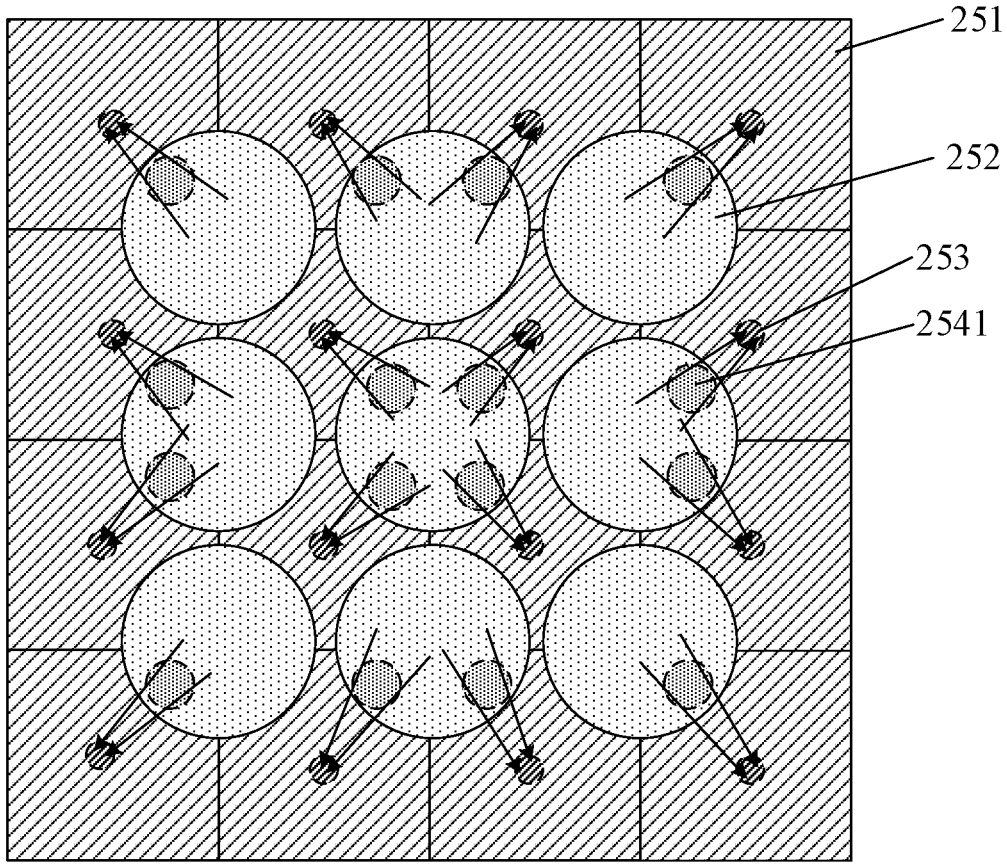

For example, as shown in FIG. 27, the at least one light shielding layer may include a top light shielding layer and a bottom light shielding layer. The top light shielding layer is provided with openings 2541 respectively corresponding to the 16 optical sensing pixels 251, and the bottom light shielding layer is provided with openings 253 respectively corresponding to the 16 optical sensing pixels 251. Accordingly, the nine micro lenses 252 may converge the oblique light signals in the multiple directions respectively to the 16 optical sensing pixels 251 through the corresponding openings 2541 and openings 253.

Therefore, the fingerprint detection apparatus may include a plurality of optical sensing pixels as shown in FIG. 28, where "1", "2", "3" and "4" respectively represent optical sensing pixels for receiving light signals in four different directions. That is, the optical sensing pixels represented by "1", "2", "3" and "4" each may be used to generate a fingerprint image, that is, a total of four fingerprint images may be generated, and these four fingerprint images may be used to merge into a fingerprint image with high resolution, thereby improving the identification effect of the fingerprint detection apparatus.

Figure 29:
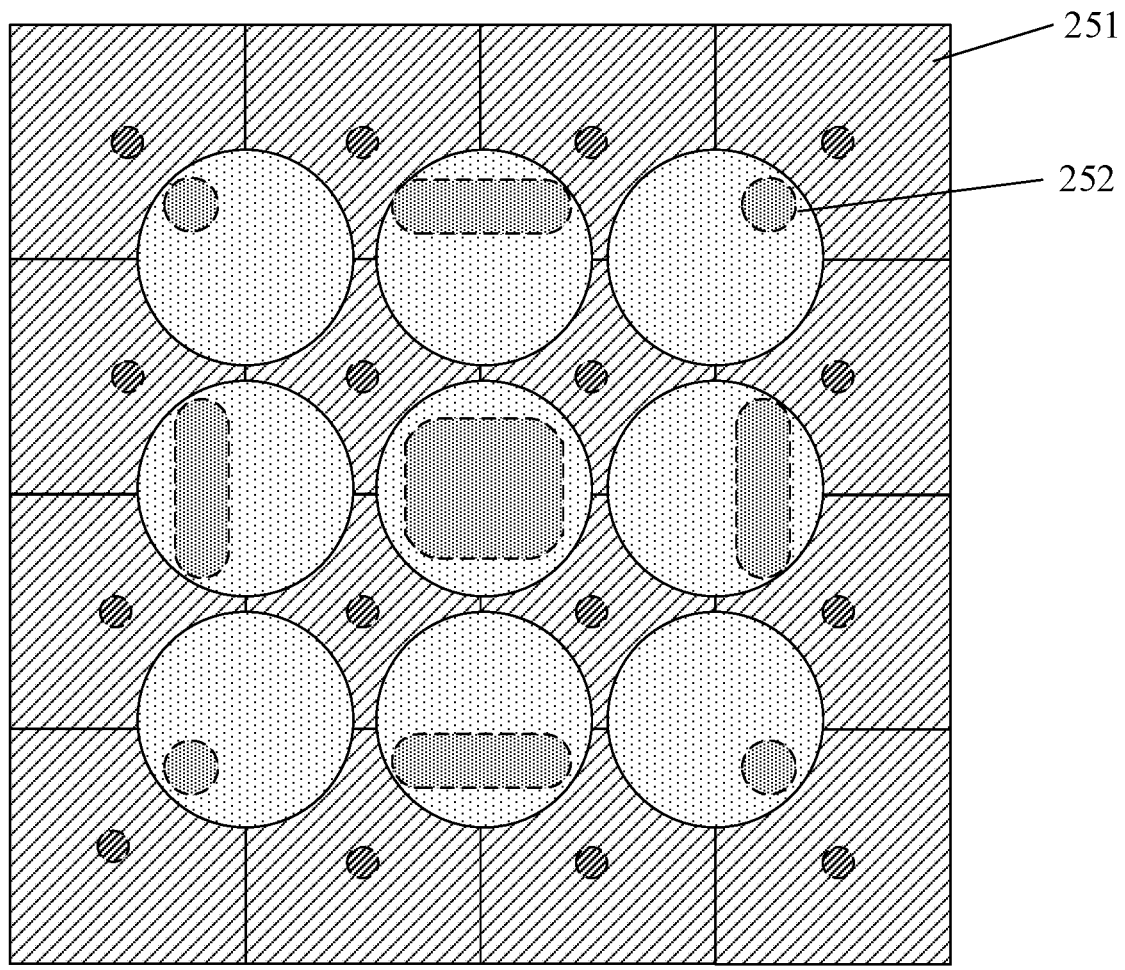

Certainly, FIG. 27 is only an example of the present application and should not be understood as limitation to the present application For example, as shown in FIG. 29, two small holes in the top light shielding layer corresponding to two optical sensing pixels 251 located between two corners in the rectangular array of 4×4 optical sensing pixels may merge into a large hole, and four small holes in the top light shielding layer corresponding to four adjacent optical sensing pixels 251 located at a center position of the rectangular array of 4×4 optical sensing pixels may merge into a large hole, so as to reduce processing difficulty and increase an amount of converged light signals, thereby improving the fingerprint identification effect of the fingerprint detection apparatus.

It should be understood that FIG. 5 to FIG. 28 are only examples of the present application and should not be understood as limitation to the present application.

For example, the light path designs are described in the foregoing drawings by an example that the at least one light shielding layer includes a top light shielding layer and a bottom light shielding layer, but the present application is not limited thereto.

For example, in one embodiment of the present application, the at least one light shielding layer included in the fingerprint detection apparatus is a plurality of light shielding layers, a bottom light shielding layer of the plurality of light shielding layers is provided with a plurality of openings respectively corresponding to the optical sensing pixels so that the at least one micro lens converges the oblique light signals in the multiple directions respectively to the plurality of optical sensing pixels through the plurality of openings.

In a specific implementation, apertures of openings in the plurality of light shielding layers corresponding to a same optical sensing pixel decrease in order from top to bottom. An aperture of an opening in an upper light shielding layer is set to be larger than an aperture of an opening in a lower light shielding layer so that the plurality of light shielding layer may direct more light signals (in a certain angular range) to corresponding photosensitive pixels.

For another example, in some other embodiments of the present application, the at least one light shielding layer may be one light shielding layer, the one light shielding layer is provided with a plurality of oblique holes respectively corresponding to the plurality of optical sensing pixels so that the at least one micro lens converges the oblique light signals in the multiple directions respectively to the plurality of optical sensing pixels through the plurality of oblique holes.

In a specific implementation, a thickness of the one light shielding layer may be greater than or equal to a preset thickness so that the plurality of oblique holes are respectively used to transmit the oblique light signals in the multiple directions, thereby avoiding occurrence of crosstalk in the oblique light signals transmitted by the plurality of oblique holes.

It should be understood that an oblique angle of each of the plurality of oblique holes may be determined according to requirements of a light path design. The plurality of oblique holes may be a plurality of oblique holes with oblique angles different from each other, or oblique holes with the partially same or wholly same oblique angles.

In one embodiment of the present application, transmittance of each of the at least one light shielding layer to light in a specific wave band (such as visible light or a wave band above 610 nm) is less than 20% to avoid corresponding light from passing through. For example, each of the at least one light shielding layer may be a metal layer, and correspondingly, an opening provided in a light shielding layer may be a via formed in a metal layer.

For example, the opening is a cylindrical via. In one embodiment of the present application, an aperture of the opening is larger than 100 nm so as to transmit required light for imaging. The aperture of the opening is also less than a predetermined value to ensure the light shielding layer could shield unwanted light. That is, a parameter of the opening is set as far as possible such that light signals required for imaging are transmitted to optical sensing pixels to the maximum and unwanted light are shielded to the maximum. For example, the parameter of the opening may be set such that a light signal obliquely incident at a specific angle (for example 35 degrees) is transmitted to a corresponding optical sensing pixel to the maximum and other light signals are shielded to the maximum.

In some embodiments of the present application, the fingerprint detection apparatus may further include a transparent medium layer.

The transparent medium layer is used to connect the at least one micro lens, the at least one light shielding layer and the plurality of optical sensing pixels. The transparent medium layer may transmit a light signal in a target wave band (that is, a light signal in a wave band required for fingerprint detection). For example, the transparent medium layer may adopt an oxide, a nitride or the like. Optionally, the transparent medium layer may include a plurality of layers to respectively achieve functions such as protection, transition and cushioning. For example, a transition layer may be disposed between an inorganic layer and an organic layer to achieve tight connection; and a protective layer may be disposed on an easily oxidized layer to achieve protection.

In some embodiments of the present application, the fingerprint detection apparatus may further include a filter layer.

The filter layer is disposed in a light path between the at least one micro lens and the plurality of optical sensing pixels or disposed above the at least one micro lens, and used to filter out a light signal in a non-target wave band to transmit a light signal in a target wave band. Optionally, transmittance of the filter layer to light in a target wave band is greater than or equal to 80%, and a cutoff rate of the filter layer to light in a non-target wave band is greater than or equal to 80%. Optionally, the filter layer may be a filter layer independently provided. For example, the filter layer may be a filter layer formed by using blue crystal or blue glass as a carrier. Optionally, the filter layer may be a coating film provided on a surface of any layer in the light path. For example, a coating film may be provided on a surface of a photosensitive pixel, a surface of any one of transparent medium layers, a lower surface of a micro lens or the like so as to form the filter layer.

An embodiment of the present application further provides an electronic device, and the electronic device may include a display screen and the fingerprint detection apparatus according to the foregoing embodiments of the present application, where the fingerprint detection apparatus is disposed under the display screen to achieve under-screen optical fingerprint detection.

The electronic device may be any electronic device having a display screen.

The display screen may use the display screen in the above description, such as an OLED display screen or other display screens. For a description of the display screen, reference may be made to illustration of the display screen in the above description, and for brevity, no further details are provided herein.

It should be understood that specific examples in embodiments of the present application are just for helping those skilled in the art better understand the embodiments of the present application, rather than for limiting the scope of the embodiments of the present application.

It should be understood that terms used in embodiments of the present application and the claims appended hereto are merely for the purpose of describing particular embodiments, and are not intended to limit the embodiments of the present application. For example, the use of a singular form of "a", "the above" and "said" in the embodiments of the present application and the claims appended hereto are also intended to include a plural form, unless otherwise clearly indicated herein by context.

Those of ordinary skill in the art may be aware that, units of the examples described in the embodiments disclosed in this paper may be implemented by electronic hardware, computer software, or a combination of the two. To clearly illustrate interchangeability between the hardware and the software, the foregoing illustration has generally described composition and steps of the examples according to functions. Whether these functions are performed by hardware or software depends on particular applications and designed constraint conditions of the technical solutions. Persons skilled in the art may use different methods to implement the described functions for each particular application, but it should not be considered that the implementation goes beyond the scope of the present application.

In the several embodiments provided in the present application, it should be understood that, the disclosed system and apparatus may be implemented in other manners. For example, the foregoing described apparatus embodiments are merely exemplary. For example, division of the units is merely logical function division and there may be other division manners in practical implementation. For example, multiple units or components may be combined or integrated into another system, or some features may be ignored or not executed. In addition, the displayed or discussed mutual coupling or direct coupling or communication connection may be indirect coupling or communication connection through some interfaces, apparatuses or units, and may also be electrical, mechanical, or connection in other forms.

The units described as separate components may or may not be physically separate, and components displayed as units may or may not be physical units, may be located in one position, or may be distributed on multiple network units. Part of or all of the units here may be selected according to a practical need to achieve the objectives of the solutions of the embodiments of the present application.

In addition, various functional units in the embodiments of the present application may be integrated into a processing unit, or each unit may exist alone physically, or two or more than two units may be integrated into one unit. The integrated unit may be implemented in a form of hardware, or may be implemented in a form of a software functional unit.

If the integrated unit is implemented in the form of the software functional unit and is sold or used as an independent product, it may be stored in a computer readable storage medium. Based on such understanding, the nature of the technical solutions of the present application, or the part contributing to the prior art, or all of or part of the technical solutions may be implemented in a form of software product. The computer software product is stored in a storage medium and includes several instructions for instructing a computer device (which may be a personal computer, a server, a network device, or the like) to execute all of or part of the steps of the method described in the embodiments of the present application. The storage medium includes: various media that may store program codes, such as a U-disk, a removable hard disk, a read-only memory (ROM), a random access memory (RAM), a magnetic disk, a compact disk, and so on.

The foregoing descriptions are merely specific implementations of the present application. The protection scope of the present application, however, is not limited thereto. Various equivalent modifications or replacements may be readily conceivable to any person skilled in the art within the technical scope disclosed in the present application, and such modifications or replacements shall fall within the protection scope of the present application. Therefore, the protection scope of the present application shall be subject to the protection scope of the claims.

What is claimed is:

1. A fingerprint detection apparatus, wherein the fingerprint detection apparatus is applied under a display screen to achieve under-screen optical fingerprint detection, the fingerprint detection apparatus comprises a plurality of fingerprint detecting units distributed in an array or arranged in a staggered manner, and each of the plurality of fingerprint detecting units comprises:

a plurality of optical sensing pixels;

at least one micro lens disposed above the plurality of optical sensing pixels; and at least one light shielding layer disposed between the at least one micro lens and the plurality of optical sensing pixels, each of the at least one light shielding layer being provided with an opening corresponding to the plurality of optical sensing pixels;

wherein the plurality of optical sensing pixels are divided into a plurality of optical sensing pixel groups, the plurality of optical sensing pixel groups are respectively configured to receive oblique light signals in multiple directions, which are reflected from a finger above the display screen and transmitted through an opening provided in the at least one light shielding layer after being converged by the at least one micro lens, and the oblique light signals are used to detect fingerprint information of the finger; and wherein the at least one micro lens is one micro lens, and the plurality of optical sensing pixels are a rectangular array of 2×2 optical sensing pixels, where the one micro lens is disposed right above the rectangular array of 2×2 optical sensing pixels.

2. The fingerprint detection apparatus according to claim 1, wherein the one micro lens receives the oblique light signals in the multiple directions in a diagonal direction of the rectangular array of 2×2 optical sensing pixels, and the one micro lens converges the oblique light signals in the multiple directions respectively to optical sensing pixels in the rectangular array of 2×2 optical sensing pixels in the diagonal direction.

3. The fingerprint detection apparatus according to claim 1, wherein the at least one light shielding layer is a plurality of light shielding layers, a bottom light shielding layer of the plurality of light shielding layers is provided with a plurality of openings respectively corresponding to the plurality of optical sensing pixels so that the at least one micro lens converges the oblique light signals in the multiple directions respectively to the plurality of optical sensing pixels through the plurality of openings, apertures of openings in the plurality of light shielding layers corresponding to a same optical sensing pixel decrease in order from top to bottom.

4. The fingerprint detection apparatus according to claim 3, wherein a top light shielding layer of the plurality of light shielding layers is provided with at least one opening corresponding to the plurality of optical sensing pixels.

5. The fingerprint detection apparatus according to claim 1, wherein the at least one light shielding layer is one light shielding layer, and the one light shielding layer is provided with a plurality of oblique holes respectively corresponding to the plurality of optical sensing pixels so that the at least one micro lens converges the oblique light signals in the multiple directions respectively to the plurality of optical sensing pixels through the plurality of oblique holes.

6. The fingerprint detection apparatus according to claim 5, wherein a thickness of the one light shielding layer is greater than or equal to a preset thickness so that the plurality of oblique holes are respectively used to transmit the oblique light signals in the multiple directions.

7. The fingerprint detection apparatus according to claim 1, wherein the fingerprint detection apparatus further comprises:
a transparent medium layer;
wherein the transparent medium layer is used to connect the at least one micro lens, the at least one light shielding layer and the plurality of optical sensing pixels.

8. The fingerprint detection apparatus according to claim 1, wherein the fingerprint detection apparatus further comprises:
a filter layer;
wherein the filter layer is disposed in a light path between the at least one micro lens and the plurality of optical sensing pixels or disposed above the at least one micro lens, and used to filter out a light signal in a non-target wave band to transmit a light signal in a target wave band.

9. A fingerprint detection apparatus, wherein the fingerprint detection apparatus is applied under a display screen to achieve under-screen optical fingerprint detection, the fingerprint detection apparatus comprises a plurality of fingerprint detecting units distributed in an array or arranged in a staggered manner, and each of the plurality of fingerprint detecting units comprises:
a plurality of optical sensing pixels;
at least one micro lens disposed above the plurality of optical sensing pixels; and
at least one light shielding layer disposed between the at least one micro lens and the plurality of optical sensing pixels, each of the at least one light shielding layer being provided with an opening corresponding to the plurality of optical sensing pixels;
wherein the plurality of optical sensing pixels are divided into a plurality of optical sensing pixel groups, the plurality of optical sensing pixel groups are respectively configured to receive oblique light signals in multiple directions, which are reflected from a finger above the display screen and transmitted through an opening provided in the at least one light shielding layer after being converged by the at least one micro lens, and the oblique light signals are used to detect fingerprint information of the finger; and
wherein the at least one micro lens is a rectangular array of 2×2 micro lenses, the plurality of optical sensing pixels are a rectangular array of 3×3 optical sensing pixels, and one micro lens is disposed right above every four adjacent optical sensing pixels in the rectangular array of 3×3 optical sensing pixels, each micro lens in the rectangular array of 2×2 micro lenses converges received oblique light signals to an optical sensing pixel in optical sensing pixels at four corners of the rectangular array of 3×3 optical sensing pixels that is closest to a same micro lens.

10. An electronic device, comprising:
a display screen; and
a fingerprint detection apparatus, wherein the fingerprint detection apparatus is applied under the display screen to achieve under-screen optical fingerprint detection, the fingerprint detection apparatus comprises a plurality of fingerprint detecting units distributed in an array or arranged in a staggered manner, and each of the plurality of fingerprint detecting units comprises:
a plurality of optical sensing pixels;
at least one micro lens disposed above the plurality of optical sensing pixels; and
at least one light shielding layer disposed between the at least one micro lens and the plurality of optical sensing pixels, each of the at least one light shielding layer being provided with an opening corresponding to the plurality of optical sensing pixels;
wherein the plurality of optical sensing pixels are divided into a plurality of optical sensing pixel groups, the plurality of optical sensing pixel groups are respectively configured to receive oblique light signals in multiple directions, which are reflected from a finger above the display screen and transmitted through an opening provided in the at least one light shielding layer after being converged by the at least one micro lens, and the oblique light signals are used to detect fingerprint information of the finger; and
wherein the at least one micro lens is one micro lens, and the plurality of optical sensing pixels are a rectangular array of 2×2 optical sensing pixels, where the one micro lens is disposed right above the rectangular array of 2×2 optical sensing pixels.

* * * * *